US011210143B1

(12) United States Patent
Dubey et al.

(10) Patent No.: US 11,210,143 B1
(45) Date of Patent: Dec. 28, 2021

(54) PARALLEL EXECUTION OF SYNCHRONOUS WORKFLOW STEPS

(71) Applicant: Amazon Technologies, Inc., Seattle, WA (US)

(72) Inventors: Avinash Dubey, Redmond, WA (US); Prasanta Shukla, Bothell, WA (US); Piyush Kalani, Newcastle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 5 days.

(21) Appl. No.: 16/911,887

(22) Filed: Jun. 25, 2020

(51) Int. Cl.
*G06F 9/46* (2006.01)
*G06F 9/52* (2006.01)
*G06F 9/48* (2006.01)

(52) U.S. Cl.
CPC ............ *G06F 9/526* (2013.01); *G06F 9/4881* (2013.01)

(58) Field of Classification Search
CPC ................................ G06F 9/4881; G06F 9/526
See application file for complete search history.

(56) References Cited

U.S. PATENT DOCUMENTS

2015/0244558 A1* 8/2015 Tully ................ H04L 29/08882
709/201

\* cited by examiner

*Primary Examiner* — Camquy Truong
(74) *Attorney, Agent, or Firm* — Kilpatrick Townsend & Stockton LLP

(57) ABSTRACT

Techniques are disclosed for a workflow engine performing a checkpoint phase to determine a result of a merge of workflow updates. The techniques may include the workflow engine determining to allow parallel execution of updates of a workflow. The workflow engine may receive first checkpoint data associated with a first update. The workflow engine may also receive second checkpoint data associated with a second update. The workflow engine may initiate the checkpoint phase that includes comparing one or more data elements of the first checkpoint data with respective data elements of the second checkpoint data; and determining the result of the merge of the workflow updates based on the comparing. The workflow engine may then complete the checkpoint phase and transmit the result to at least one user device for presentation.

20 Claims, 7 Drawing Sheets

PARALLEL EXECUTION OF SYNCHRONOUS WORKFLOW STEPS

BACKGROUND

Techniques exist for implementing a workflow platform, which may enable synchronous and/or asynchronous workflows. These techniques may involve the workflow platform enabling acquisition of a lock by a first client, whereby the first client may call into a workflow platform server to execute some workflow steps of a workflow. This lock effectively blocks another call (e.g., from a different client) from executing workflow steps of the workflow until the lock is released (and/or the lock duration expires). However, sometimes it may be difficult for a workflow platform server to determine whether a particular call (e.g., of a client that has acquired the lock) has timed out or is still waiting for the result. For example, it is possible that a timed out call by the first client had acquired the lock, and a retry call (e.g., from the different client) may be blocked for an undefined duration. In these cases, it may be difficult for the workflow platform to provide a consistent and efficient experience for clients.

BRIEF DESCRIPTION OF THE DRAWINGS

Various embodiments in accordance with the present disclosure will be described with reference to the drawings, in which.

DETAILED DESCRIPTION

Figure 1:
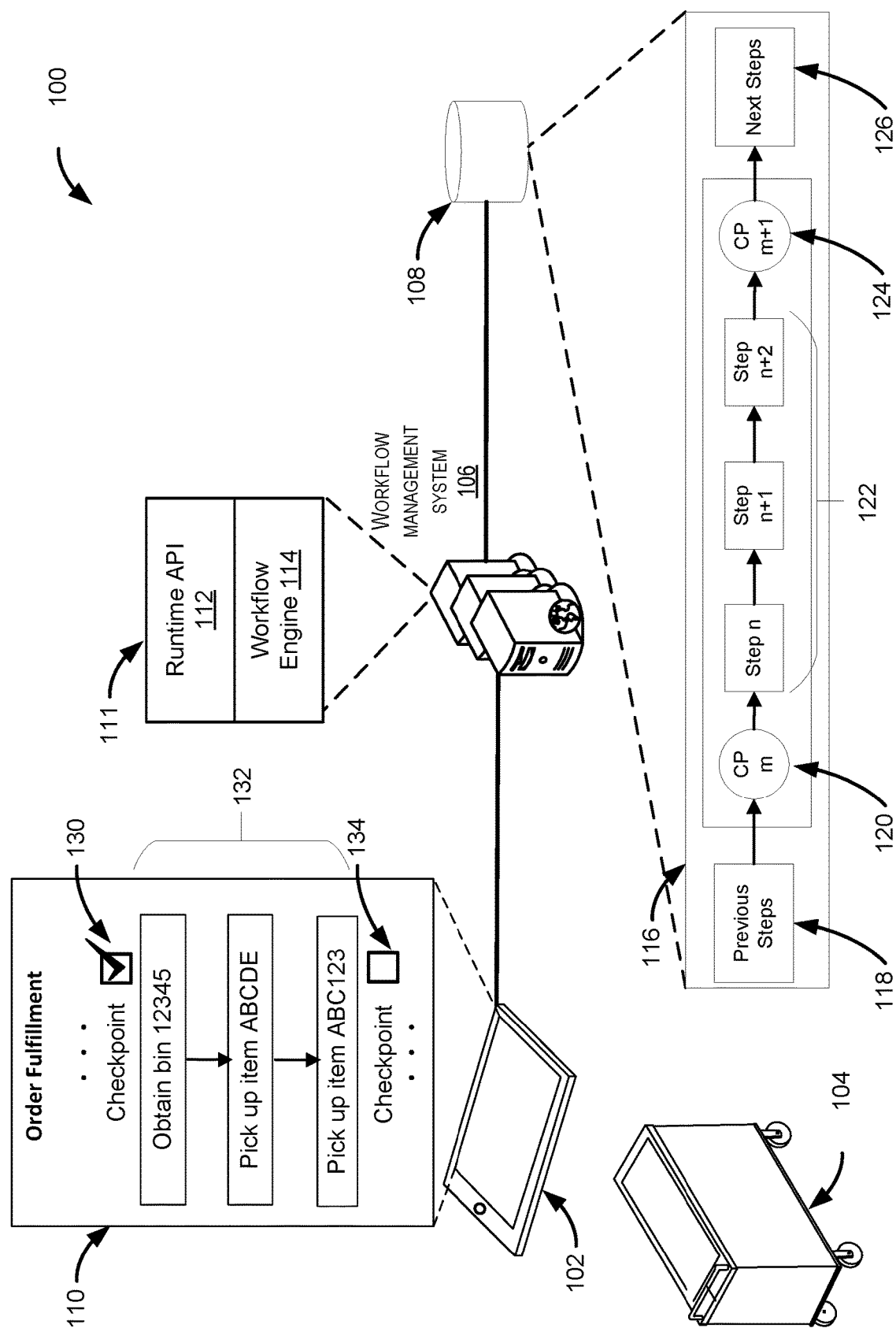
FIG. 1 is a simplified block diagram of an example system providing a workflow management system, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure may provide techniques for a workflow platform enabling parallel execution of workflow steps of a workflow. In some embodiments, the workflow platform may coordinate an execution of one or more workflows, whereby each workflow may contain one or more workflow steps. For example, in some embodiments, the workflow platform may support synchronous workflows, whereby at least some workflow steps of a synchronous workflow may be synchronized. In these cases, the workflow platform may coordinate with one or more other devices (and/or client processes) involved in performing workflow steps to ensure that the workflow is synchronized upon performance of each workflow step.

For example, consider a scenario involving a fulfillment of a customer order by a fulfillment center. In this scenario, the fulfillment of the customer order may be associated with a workflow that includes one or more synchronized workflow steps (e.g., picking up a bin, picking up a particular item associated with the order and placing it in the bin, picking up and placing a second item in the bin, etc.). As each workflow step (e.g., or set of steps) is completed (e.g., by a fulfillment center agent), a user device (e.g., a first computing thread executing on the user device) may call into an application programming interface (API) of the workflow platform (e.g., a server computer) that manages the workflow to update the workflow. The workflow platform may then validate the update (e.g., synchronizing and/or committing the workflow steps performed) by performing a checkpoint phase, and then transmit a result (e.g., "Success") back to the user device (e.g., indicating that the update was successfully committed), upon which the user device may then prompt the agent (e.g., by displaying a green light) to perform a next workflow step of the workflow.

In some examples, threads and/or devices may lose network connectivity and/or experience other communication issues when interacting with the workflow platform (e.g., in a distributed computing environment). For example, in the scenario above, the first thread may have lost a network connection with the workflow platform (or otherwise timed out), and the user device may, transparent to the user, spawn another second thread to retry recording the completion of the workflow step. The workflow platform may allow duplicate workflow updates (e.g., workflow steps) respectively associated with each thread to continue executing in parallel and unblocked, and then execute a consensus algorithm during the checkpoint phase to merge the respective workflow updates using checkpoint data from each update. Upon completion of the checkpoint phase, the workflow platform may return a result of the checkpoint phase (e.g., success) to both threads, whereby the user device may utilize the data results from at least one of the threads (e.g., the second thread) to prompt the agent to perform the next workflow step. In at least this way, the workflow platform may provide a more consistent and efficient experience to end-user devices.

In an illustrative example, consider a scenario in which a workflow management system may implement a workflow platform that manages one or more workflows associated with customer order fulfillment. In some embodiments, a workflow may include one or more workflow steps that are represented by the workflow platform. In this example, the workflow may be a synchronous workflow (e.g., including synchronized workflow steps), whereby performance of at least one of the workflow step may be dependent on successful completion of another workflow step of the workflow. For example, using the customer order fulfillment context for illustration, the synchronous workflow may include at least four workflow steps: A) locate and obtain an empty bin (e.g., within a fulfillment center warehouse), B) locate a first item associated with a customer order, and place the first item in the bin, C) locate a second item associated with the customer order, and place the second item in the bin, D) bring the bin to a distribution area for packaging of the items. In this example, performance of steps B and C may be dependent on step A being successfully completed, while performance of step D may be dependent on steps B and C being successfully completed. In some embodiments, the workflow platform may manage (e.g., maintain) a particular workflow in part by maintaining a workflow graph that includes workflow steps and represents relationships (e.g., dependencies) between the different workflow steps. The workflow platform may also maintain a context of the workflow, for example, indicating which workflow steps have been completed (e.g., a state of the workflow), input values associated with each workflow step (e.g., a serial number of an item placed in the bin, an associated record), etc.

Continuing with the above illustration, suppose that a user device is utilized within a fulfillment center by a user (e.g., a fulfillment agent) to update a workflow by performing one or more of the workflow steps of the workflow and then synchronizing the update with the workflow platform. For example, suppose that the user device presents (e.g., via a graphical user interface (GUI) application) an instruction to the user to perform step A. Upon locating and obtaining the empty bin by the user, the user device may scan the bin. The user device may then execute one or more calls to a runtime API of the workflow platform to update the workflow (e.g., updating the workflow graph and/or context of the workflow) maintained by the workflow platform. For example, the user device may spawn a first thread for executing the workflow update via the runtime API. The first thread may obtain (e.g., generate) at least a first context input (or "first input") and a first idempotency key (IK). The first input may include one or more inputs (e.g., alphanumeric string values) associated with the workflow update. In this example, the first input may correspond to an identifier (e.g., a bin serial number) that uniquely identifies the bin that was obtained (e.g., and scanned by the user device) in workflow step A. The first idempotency key may be a unique key (e.g., an alphanumeric string value) that is generated by the user device and associated with the particular update to the workflow (e.g., the completion of workflow step A). In some embodiments described herein, an idempotency key may be a unique value (e.g., generated by a client (or host, thread, etc.)) which the workflow engine may use to recognize subsequent retries of the same update request. The first thread may then execute an API call to load (e.g., from a data store communicatively connected to the workflow platform) the workflow graph and the workflow context. In some embodiments, the first input and/or the first idempotency key may be used to load the workflow graph and/or the workflow context. In some embodiments, the workflow context may also be loaded with (e.g., and/or include) a first record version identifier (e.g., a first record version number (RVN)) that is associated with the workflow context. In some embodiments, an RVN may indicate a version of a particular record (e.g., a customer order record). Accordingly, the first RVN may indicate the current RVN of the particular record at the time the record is retrieved from the data store (e.g., along with the workflow context). Upon loading the workflow graph and the workflow context with the first RVN, the first thread may further execute an API call to perform one or more computing operations that correspond to recording the performance of the workflow step A in the real world. For example, the API call may update the workflow context by storing (e.g., in the data store) the first input to the particular customer order record. The API call may update the workflow graph to indicate that one or more workflow steps (e.g., step A, obtaining the bin) have been performed. In some embodiments discussed herein, for example in cases where workflow steps are performed in the real world (e.g., gathering items into a bin, processing an online order via a separate web service) and then recorded via API calls to the workflow platform, the analogous computing operations performed to update the workflow maintained by the workflow platform (e.g., updating the workflow graph and/or workflow context to record the workflow steps performed) may also be referred to as a performance of "workflow steps."

It should be understood that, in this example, the first thread did not acquire a lock from the workflow platform (e.g., a workflow engine of the workflow platform) to perform any of the operations described above (e.g., loading the workflow graph, loading the workflow context, performing the workflow steps). Accordingly, as described further below, a second thread (e.g., executing by the user device) may be unblocked (e.g., allowed) to perform any one or more of the operations described with respect to the first thread in parallel with the first thread. It should be understood that, in some embodiments, by determining not to block other threads (e.g., and/or clients, hosts, etc.) from performing updates in parallel, the workflow platform may enable synchronous workflows to execute without blocking (e.g., without requiring a process/thread executing workflow steps to acquire a lock).

Continuing with the illustration above, upon completion of the workflow steps of the update by the first thread of the user device, the workflow engine of the workflow platform may receive checkpoint data (or "first checkpoint data") associated with the update (which also may be referred to as the "first update," associated with the first thread). For example, the first thread may invoke a call to the runtime API (e.g., or other suitable API) to synchronize the workflow, whereby parameters of the call may include the checkpoint data. In some embodiments, the checkpoint data may include at least three data elements: (1) the first input, (2) the first idempotency key, and (3) the first RVN). Upon receiving the checkpoint data, the workflow engine may initiate a checkpoint phase to synchronize the workflow. In some embodiments, as part of the checkpoint phase, the workflow engine may retrieve a current RVN associated with the current version of the particular record associated with the update. In this example, the workflow engine may compare the current RVN with the first RVN that was previously retrieved by the first thread, as described earlier. If the first RVN matches the current RVN (i.e., the version number of the particular record maintained by the platform) has not changed, then the workflow engine may update (e.g., increment) the current RVN. If the first RVN does not match the current RVN, the workflow engine may return an error to the first thread, which may indicate that another party has already updated the record before the first thread. In this example, the first RVN is determined to match the current RVN, and so the current RVN is updated.

As described above, based in part on the workflow engine enabling parallel execution of the update to the workflow, the second thread may also initiate a call to perform a second update that corresponds to the same workflow step of the first update that was executed by the first thread. In some embodiments, the second thread may perform the second update in parallel while the first thread also performs the same first update. In some embodiments, the second thread may perform the second update even after the first thread completes the first update and the checkpoint phase has been initiated by the workflow engine (e.g., to synchronize the workflow). For example, suppose that in the illustration above, upon the first thread initiating a call to synchronize the workflow and the initiation of the checkpoint phase, the first thread somehow lost a network connection (e.g., a broken transmission control protocol (TCP) connection) with the workflow platform server. In this case, the user device (e.g., the GUI application that spawned the first thread) may determine to spawn a second thread to retry the update. For example, the second thread may initiate a similar API call(s) to the workflow platform (e.g., loading the workflow graph, loading the workflow context with the associated RVN, and performing the workflow step of the update). In this case, as described above, the workflow engine may determine to not block the second thread from performing workflow steps of the second update, which may be substantially similar (e.g., the same) as the first update. Upon completion of the workflow steps of the second update by the second thread, the workflow engine may also receive second checkpoint data associated with the second update. For example, similar to the first checkpoint data of the first thread's update, the second checkpoint data may include at least three data elements: (1) a second input, (2) a second idempotency key, and (3) a second RVN.

In some embodiments, the workflow engine may perform the checkpoint phase by executing a consensus algorithm. The consensus algorithm may include comparing one or more data elements of the first checkpoint data with one or more respective elements of the second checkpoint data. For example, consider a first use case in which the first input matches the second input (e.g., both input values have the same bin serial number) from workflow step A above. Also, in this first use case, the first idempotency key matches the second idempotency key (e.g., having the same key value). This first use case may occur, for example, in the case where the user GUI application determines to retry the update via the second thread (e.g., as described above), and the second thread reuses the same idempotency key that the first idempotency key used (e.g., being tied to the same workflow update). In this first use case, with matching input keys and idempotency keys, the runtime engine may be able to determine that the second update corresponds to the same update as the first update. Note that in this first use case, even though the second RVN may (or may not) match the current RVN (e.g., since the current RVN was previously incremented (e.g., updated) based on the first checkpoint data including the first RVN from the first update), the workflow engine may still be able to determine that the updates are the same (e.g., since both the inputs and the idempotency keys match). Accordingly, in this first use case, the consensus algorithm may be able to merge the updates independent of the values of the respective RVNs. In this first use case, upon completing the comparison of the inputs and the idempotency keys to determine respective matches, the workflow engine may determine a result (e.g., both updates are successful), and then complete the checkpoint phase. In some embodiments, completion of the checkpoint phase may include any suitable operations, including, but not limited to, updating the workflow graph and/or context, communicating with other distributed servers that updated workflow graph information, determining next workflow steps, etc.). Upon completion of the checkpoint phase, the workflow engine may also then return "Success" (or equivalent thereof) to at least one (e.g., or more) of the threads based on the determined result. For example, even though in the illustration above, the first thread's update was actually used by the workflow engine used update the RVN (e.g., and otherwise merge the completed workflow steps with the workflow context and/or workflow graph), the workflow engine may still return success to the second thread. In this way, even though the first thread had lost connection (or other network issue and/or race condition occurred), the workflow engine may alert the user device (e.g., via the second thread) that the second update (i.e., the retry of the first update) was successful.

As described above, in some embodiments, upon the user device receiving (e.g., via the first and/or second thread) the results of the checkpoint phase from the workflow engine, the user device may then determine next steps. For example, in the case where the results indicate that the update was successful, the user device may present an indicator (e.g., via a green light or other suitable indicator of the GUI) that the update was successfully synchronized (e.g., merged and/or committed) by the system, and may then prompt the user to perform the next workflow step. It should be understood that, in this example, even though the two threads executed in parallel to perform the same update (e.g., corresponding to the workflow step A), the backend synchronization (e.g., the consensus algorithm used to merge the two updates) may be performed by the workflow engine transparently to the user device. In at least this way, the workflow platform may provide a more consistent and efficient experience to the user device.

In some embodiments, and, returning to the illustration above, the workflow engine may execute the consensus algorithm to compare respective data elements of the first and second checkpoint data in a second use case that is different from the first use case (e.g., not a retry scenario). In this second use case, the first idempotency key and the second idempotency key may be the same, while the first input is different from the second input. For example, consider a scenario in which the first idempotency key and the second idempotency key are respectively programmed to correspond to the type of item being ordered in a customer order. Furthermore, suppose that the customer order of the illustration above included an order for two items (e.g., televisions (TVs)) of the same type (e.g., steps B and C respectively correspond to different items of the same item type). Accordingly, in this example, the first idempotency key and the second idempotency key may both determined to correspond to the same TV type, while the first input is different from the second input. For example, the first input may correspond to a unique serial number of the first TV, while the second input corresponds to a different unique serial number of the second TV. In some examples, this use case may occur if there is a system programming error and/or administrator input error whereby two different inputs have the same idempotency key. In this case, upon performing the consensus algorithm during the checkpoint phase, the workflow engine may determine that there is a conflict, at least in part because the input values are different, while the idempotency keys are the same. In this case, instead of returning "Success" to both threads (or clients, hosts, etc., described further herein), the workflow engine may first determine a "winning" thread. For example, suppose that, in the example above, the first thread first executed the first update for step B (e.g., with the first input and first the idempotency key), which caused the RVN to be incremented by the workflow engine during the checkpoint phase. Then, the second thread (e.g., with the second input that is different from the first input) also attempted to use the same idempotency key to execute the update for step C. In this case, the workflow engine may determine during the checkpoint phase that the RVN of the customer order had already been incremented by the update of the first thread. Accordingly, the workflow engine may determine that the first thread is the "winning thread," and the second thread is the "losing thread." In some embodiments, this technique may be referred to as "optimistic locking," (although no exclusive lock is obtained) as described further herein. The workflow engine may complete the checkpoint phase, and then return a "Success" result to the first thread and also return a conflict exception result to the second thread. In this example, upon the second thread receiving the conflict exception result, the second thread may then retry the update (e.g., for step C). For example, the second thread may retry loading the workflow context (e.g., with the updated RVN) and workflow graph, and then perform step C again. In some embodiments, the second thread may use an updated (e.g., new idempotency key).

It should be understood that, in some embodiments of the second use case (and/or third or fourth uses cases described below), even before the workflow engine may execute the consensus algorithm to merge the updates and determine an error condition, one of the threads may itself determine an error condition in advance of (e.g., and/or alternatively to) the consensus algorithm being executed. Using the example above, during a runtime API call of the second thread (e.g., to write an input to the data store), the runtime API may return an error (e.g., if the RVN of the pertinent record had already been previously incremented). However, as described above, in some embodiments, the runtime API may not return an error to the invoking thread in advance (e.g., if the workflow steps are read-only). In these cases, the workflow engine may ultimately determine (e.g., as a fallback mechanism) the losing thread and the winning thread based on comparing the corresponding data elements of both sets of checkpoint data. In this way, embodiments of the present disclosure may allow for a parallel execution of updates, even while accounting for possible error conditions via comparison of one or more data elements of respective checkpoint data.

In some embodiments, the workflow engine may execute the consensus algorithm to compare respective data elements of the first and second checkpoint data in a third use case (e.g., different from the first and second cases described above). In this third use case, the first idempotency key and the second idempotency key are different, and the first and second inputs are either the same or different. In some examples, this third use case may also occur due to a system programming error and/or administrator input error. For example, an administrator error may cause a different idempotency key to be assigned to the same update (e.g., corresponding to step A above). In this case, suppose that the first thread performs the first update (e.g., with the first idempotency key), which causes the RVN for the particular record to be incremented by the workflow engine during the checkpoint phase. In this case, however, the second thread also attempts to perform the same update in parallel using the second idempotency key that is different from the first idempotency key (e.g., due to the administrator error), and after the RVN for the particular record has already been incremented (e.g., via the first thread's update). During the checkpoint phase, the workflow engine may detect that the idempotency keys are different. Accordingly, even if the user device had determined for the second thread to perform the same update as the first thread, the workflow engine may not be able to ascertain that determination (e.g., because the idempotency keys are different, unlike the first use case described above). Accordingly, in this case, the workflow engine will return success to the first thread and return an exception to the second thread. For example, similar to the second use case described above, the workflow engine may determine that the RVN has already been incremented based on the update by the first thread (e.g., and thus, the first thread is the "winning" thread). The workflow engine may then return a "Success" result to the first thread, and return the exception (e.g., error to the second thread). Also, as described above with respect to the second use case, in some embodiments, a thread may itself determine an error condition in advance of (e.g., and/or alternatively to) the consensus algorithm being executed (e.g., if the runtime API executing a write call when executing a workflow step returns an error). However, in the event that the runtime API does not return an error (e.g., if the workflow steps are read-only), the workflow engine may ultimately determine (e.g., as a fallback mechanism) the error condition.

In some embodiments, the workflow engine may execute the consensus algorithm in a fourth use case, whereby an exception is returned to both threads. Using the earlier customer order fulfillment scenario for illustration, suppose that both first checkpoint data of a first thread and second checkpoint data of a second thread contain some error. For example, both the first RVN (of the first checkpoint data) and the second RVN (of the second checkpoint data) may be misaligned (e.g., a lower version number) from the current RVN of the particular record being updated. In this case, the workflow engine may return a synchronization error to both threads. It should be understood that any suitable error condition may be envisioned with respect to any one or more of the second, third, or fourth use cases.

In some embodiments, each of the four cases described above illustrate different scenarios in which the workflow engine may synchronize a workflow by merging parallel-executing updates of the workflow. In some embodiments, two or more updates may be executed in parallel when at least one or more operations corresponding to each update (e.g., loading a workflow graph, performing workflow steps, etc.) are performed within a predefined threshold amount of time between the operations (e.g., before a timeout may occur). In each of the four cases, as described above, the workflow engine may perform the merge by comparing respective checkpoint data elements between the parallel-executing updates. In this way, embodiments of the present disclosure may support parallel execution of workflow updates (e.g., workflow steps), without requiring any thread executing the update to acquire a lock.

For clarity of illustration, it should be understood that, although embodiments of the present disclosure may primarily describe workflow updates being performed by one or more threads (e.g., of the same process), embodiments should not be construed to be so limiting. For example, two (or more) different processes (e.g., web browser processes/applications)) may, respectively execute API calls to update a workflow (e.g., to complete an online shopping experience). For example, suppose that a user clicks to "Submit" an online order, but the connection for the particular browser (e.g., browser tab) becomes disconnected. The user may open a new browser (e.g., launching a new process) to submit the same order, which may be similar to the first use case described above (e.g., same inputs, same idempotency key). In some embodiments, the term "thread" (and/or "process," "application," etc.) may be used interchangeably with the term "client," depending on the context. In another example, two (or more) different hosts (e.g., two different user devices) may, respectively execute API calls to update a workflow. For example, multiple handheld scanning user devices may be utilized by fulfillment center agents to complete a particular customer order. Accordingly, it should be understood that embodiments may be performed by any suitable types of entities, numbers of entities, and/or combinations thereof. It should also be understood that, as described herein, execution of a workflow update by a client (e.g., a thread, process, etc.) or host may involve calling the runtime API to create a runtime workflow instance (e.g., a workflow update process) on the workflow platform that executes one or more operations on behalf of the calling client or host.

Also, as described above, it should be understood that embodiments may be performed within any suitable type of workflow context. For example, although the illustration depicted above (and described further herein) corresponds to fulfillment of a customer order in a physical environment (e.g., obtaining items into a bin for later packaging), other suitable workflows may also be performed in a digital environment (e.g., workflow steps to complete a customer order online). Also, although embodiments of the techniques described herein may be typically described in the context of a synchronous workflow, embodiments should not be construed to be so limiting. For example, in some embodiments, the workflow platform may be configured to support asynchronous workflows, synchronous workflows, and/or any suitable combination thereof.

The embodiments of the present disclosure provide several technical advantages over existing systems. In one example, embodiments of the present disclosure may provide a more consistent user experience than conventional methods. For example, some conventional methods may require a process (e.g., a thread, host, etc.) executing a workflow step to acquire a lock, thus preventing another process from performing the same workflow step (and/or otherwise updating the workflow). However, as described herein, this may cause issues when the workflow platform may not be able to readily determine if a process that has acquired the lock is still waiting for the result, has timed out, has a broken network connection, or some other problem has occurred. In some cases, these issues may be more common in a distributed computing environment, for example, in which the workflow platform may be implemented across one or more server clusters (e.g., within a large scale customer order fulfillment operation). For example, in a distributed computing environment, timeouts, race conditions, and retries may be more common. Accordingly, conflicting updates may be a more common issue. Also, the additional complexity may introduce system errors (e.g., programming errors, etc.). For example, the same idempotency key may mistakenly be used for two different updates, as described herein. Embodiments described herein improve upon conventional methods, at least because the workflow platform may support parallel execution of updates without blocking (e.g., without requiring a lock mechanism to be invoked by a calling process that is performing the update). The workflow engine may utilize the checkpoint data elements to perform a merge across parallel updates (e.g., determining "winning" and/or "losing" callers) to support workflow synchronization. Thus, even though the workflow platform may not know if one or more processes have timed out or are still waiting for the merge results, the workflow platform may still process updates for each of the parallel executing processes. This mitigates a scenario under some conventional methods, especially in a distributed computing environment, in which a timed out call of a process that had taken a lock causes another process (e.g., performing a retry of the update) to be blocked from performing the update for an undefined duration. Thus, processes (e.g., clients) performing updates may have a more consistent experience (e.g., lower and consistent wait times when performing updates). This may be especially important in a fulfillment center environment, where timely customer order fulfillment is important. For example, fulfillment agents may desire to receive prompt feedback (e.g., via their user device) to confirm that the result from a last performed workflow step (e.g., scanning an item and placing it in the bin) was received and acknowledged by the workflow platform, and that they can proceed to the next workflow step. Accordingly, embodiments of the present disclosure also enable a more efficient workflow platform, providing more timely feedback based on workflow updates. When considered in a large-scale operation involving complex workflows (e.g., with many workflow step dependencies), these efficiency improvements may provide significant improvements in computing resource utilization (e.g., memory, processor resources) and/or human resource utilization. For example, a workflow may be performed quicker than under conventional methods, thus freeing up resources to be used for other tasks.

FIG. 1 is a simplified block diagram 100 of an example system providing a workflow platform that enables parallel execution of workflow updates, whereby the workflow updates are later merged during a checkpoint phase based on a comparison of checkpoint data. In FIG. 1, several elements are depicted, including a user device 102, a bin 104, a workflow management system 106, and a data store 108. The user device 102 includes a display for presenting a GUI 110. The workflow management system 106 implements a workflow platform 111, whereby the workflow platform 111 includes a runtime API 112 and a workflow engine 114. The data store includes a workflow graph 116 (and workflow context) that is stored in the data store.

Turning to the components of FIG. 1 in further detail, in some embodiments, the user device 102 (which also may be known as a "host") may be any computing device suitable for communicating with the workflow management system 106 (and/or the data store 108). For example, as discussed herein, the user device 102 may execute one or more API calls to the runtime API 112 of the workflow platform 111. In some embodiments, the user device 102 may also be able to receive data (e.g., results from a checkpoint phase) from the workflow platform 111 (e.g., transmitted by the workflow engine 114). Some non-limiting examples of user device types may be a tablet device, laptop personal computer (PC), a mobile phone, etc. In some embodiments, the user device 102 may be physically coupled with the workflow management system 106. In some embodiments, the user device 102 may be remote from the workflow management system 106. In some embodiments, the user device 102 may execute one or more clients (e.g., applications, threads) that communicate with the workflow platform. Accordingly, as described herein (e.g., see FIG. 2), in some embodiments, the single user device 102 may execute a plurality of threads that execute workflow updates in parallel via the workflow platform 111. For example, a workflow update retry scenario whereby a first thread may have lost the connection (e.g., the first use case of the consensus algorithm described herein). In this first use case, the user device 102 may spawn a second thread (e.g., or application, process, etc.), to execute the retry via the workflow platform 111. In some embodiments, multiple user devices (e.g., multiple hosts) may execute workflow updates in parallel via the workflow platform 111. For example, consider a scenario that corresponds to the second use case described herein (e.g., see FIG. 3). In this scenario suppose that a first host attempts to execute a first workflow update (e.g., corresponding to a first workflow step), while a second host attempts to execute a second workflow update (e.g., corresponding to a second (different) workflow step). In this scenario of the second use case, both updates may use the same idempotency key but have different inputs (e.g., due to a system programming error). Accordingly, as described further herein, the workflow platform will need to resolve the conflict during the checkpoint phase. For example, the update of the first host may emerge as the "winner" (e.g., the update was successfully merged), while the update of the second host may receive an conflict exception (e.g., indicating that the second host may need to retry submission of the second workflow update). It should be understood that any suitable combination of clients (e.g., threads, applications) and/or hosts (e.g., different user devices) may execute parallel workflow updates that are merged via the consensus algorithm during the checkpoint phase (e.g., executed by the workflow engine 114). For example, the consensus algorithm may classify parallel workflow updates by a combination of client processes and/or hosts within any one of the four use cases considered by the consensus algorithm, discussed further herein.

In some embodiments, the user device 102 may include (and/or otherwise be connected to) a display unit that may display the GUI 110. In some embodiments, the GUI 110 may present workflow-related information to a user, and/or enable the user to execute one or more tasks related to the workflow. For example, as illustrated in diagram 100, the GUI 110 may display one or more workflow steps associated with a workflow. In this example, the workflow may correspond to fulfillment of a customer order. The workflow may include synchronous and/or asynchronous workflow steps. After the fulfillment of one or more steps (e.g., indicated by the upper ellipsis in GUI 110), the workflow management system 106 may execute a checkpoint phase, whereby the one or more workflow steps are confirmed to be completed by the system. After executing the checkpoint phase and confirming the one or more workflow steps (e.g. including asynchronous and/or synchronous workflow steps) were successful, the workflow management system 106 may return "Success" to the user device 102, upon which the GUI 102 may present an indicator 130 (e.g., a checked box, a green light, etc.) that indicates the checkpoint was successful. The GUI 110 may then display one or more new workflow steps 132 for the user to complete. It should be understood that any of these new workflow steps (and/or any other workflow steps described herein) may themselves involve sub-steps. A first step (e.g., step A) may correspond to obtaining a particular type of bin (e.g., "12345," which may correspond to bin 104), a second step (e.g., step B) may correspond to picking up a particular type of item (e.g., "ABCDE"), and a third step (e.g., step C) may correspond to picking up another particular type of item (e.g., "ABC123"). In this example, the user device 102 may be equipped with a scanning device. After the user device 102 scans the bin 104, the item ABCDE, and the item ABC123 (e.g., completing the new workflow steps 132), the user device 102 may automatically spawn a client process to update the workflow on the backend server (e.g., the workflow management system 106). After the workflow is successfully updated, the workflow platform 111 may transmit a "Success" result to the user device 102, which may then display another indicator 134 (e.g., a checked box) that indicates the workflow steps were successfully recorded by the workflow platform 111. It should be understood that any suitable indicator may be used to perform embodiments described herein (e.g., a green color code that indicates success, a text message, etc.). It should also be understood that any suitable number of workflow steps (e.g., one, three, ten, one-hundred, etc.) may be completed between checkpoints. In this way, as workflow steps are completed and successfully committed (e.g., synchronized) by the workflow platform, the GUI 110 may be continuously updated. For example, new workflow steps may be presented that need to be completed. In this example, after the new workflow steps 132 are confirmed to be completed, next workflow steps may be subsequently presented via the GUI 110 (e.g., indicated by the lower ellipsis of GUI 11). It should be understood that, as discussed herein, successfully recording an update with the workflow platform 111 may also include a successful merge (e.g., synchronization) of parallel updates via the checkpoint phase.

In some embodiments, as workflow steps of a workflow are completed and/or new steps are added (or modified, etc.), the workflow graph 116 and/or workflow context that are maintained by the data store 108 may also be updated. For example, as depicted in FIG. 1, some elements of the workflow graph 116 may correspond to elements of GUI 110. The previous steps 118 may correspond to previous steps that were completed prior to the checkpoint 120 ("CP m," corresponding to the $m^{th}$ checkpoint of the overall workflow process), which may correspond to indicator 130 of GUI 110. The workflow steps 122 (i.e., including step n, n+1, and n+2) may correspond to the new workflow steps 132, and the checkpoint 124 ("CP m+1") may correspond to the next checkpoint presented in the GUI 110 as not yet complete (i.e., unchecked) (e.g., represented by indicator 134). In the example workflow graph 116 depicted in FIG. 1, the workflow steps 122 in between the checkpoint 120 and checkpoint 124 may correspond to synchronous workflow steps (e.g., indicated by the rectangle enclosing the checkpoints 120, 124 and workflow steps 122). Upon the completion of the new workflow steps 132 (corresponding to the workflow steps 122 of workflow graph 116), the checkpoint phase 124 may be executed and a result (e.g., "Success") may be returned to the user device 102. Assuming the result indicated "Success," the user device 102 may then present next steps according to next steps 126 of the workflow graph 116. As workflow steps are completed and/or each checkpoint phase is completed, the workflow context (e.g., including a present state of the workflow graph) may be updated and stored (e.g. by the workflow management system 106 and/or the user device 102) to the data store 108.

It should be understood that, although the diagram of FIG. 1 depicts an example workflow in a customer order fulfillment context, other workflow scenarios are also envisioned. For example, in another scenario, the user device 102 may instead be used to purchase an item online, whereby the user device 102 completes one or more workflow steps as part of the process of purchasing the item (e.g., adding one or more items to an online cart, inputting a payment account, clicking a "Submit" button, etc.). In this scenario, the workflow platform 111 may also be involved with recording workflow updates (e.g., adding an item to a cart) and confirming that a particular workflow step has been successfully recorded (e.g., via the checkpoint phase).

Turning to the workflow management system 106 in further detail, the workflow management system 106 may be implemented by one or more computer servers. For example, as described above, the workflow management system 106 may include one or more server clusters that form a distributed computing environment. For example, different server clusters may be geographically distributed throughout a region, and may communicate with each other to synchronize various components of the system (e.g., synchronizing workflows maintained by the system). The workflow management system 106 may implement the workflow platform 111, whereby the workflow platform 11 may include the runtime API 112 and the workflow engine 114.

In some embodiments, the runtime API 112 may enable one or more clients to execute a call into the runtime API 112 to perform one or more tasks related to a workflow. For example, the runtime API 112 may enable the user device 102 to load a workflow graph 116 and/or workflow context (e.g., from the data store 108), to modify the workflow context (e.g., writing to a customer order record in the data store 108), to perform a one or more workflow steps of the workflow update (e.g., analyzing customer information from the record, determining what information to write to the record based on the analysis and/or input received from the user device 102, etc.). The runtime API 112 may support any suitable workflow functions, including, but not limited to, creating a new workflow, deleting a workflow, creating sub-workflows (e.g., asynchronous and/or synchronous workflows), etc. As described above, in some embodiments, upon receiving an API call to create a new workflow, the runtime API 112 may generate a workflow graph and/or context to be stored by the data store 108. One or more clients (e.g., executing on user device 102) may perform one or more workflow steps to update the workflow by invoking the runtime API 112 to generate a runtime workflow instance of the workflow (e.g., loading the existing workflow graph and/or context). The runtime workflow instance may then update the workflow context and/or workflow graph as it executes (e.g., on the workflow platform 11) one or more workflow steps on behalf of the calling client or host.

In some embodiments, the workflow engine 114 may be responsible for managing one or more workflows. For example, the workflow engine 114 may maintain a "ground truth" state of each workflow and may ensure that API calls (e.g., via the runtime API 112) are performed in accordance with the current state of a given workflow. For example, as described further herein, after performing one or more workflow steps of a workflow update (e.g., via the runtime API 112), a client (e.g., a thread executing on user device 102) may again call the runtime API 112 to invoke the workflow engine 114 to synchronize the workflow. In some embodiments, synchronizing the workflow may include the workflow engine 114 initiating a checkpoint phase, and then performing a consensus algorithm within the checkpoint phase. In some embodiments, the consensus algorithm may receive checkpoint data (e.g., as a parameter of the API synchronization call). The workflow engine 114 may verify the checkpoint data against a current state of the workflow, and upon successful verification, may update the workflow state and return success back to the invoking client thread. In some embodiments, as described herein, multiple threads may perform workflow updates (e.g., the same workflow step(s)) in parallel. In these embodiments, as part of synchronizing the workflow during the checkpoint phase, the consensus algorithm may merge updates performed by each thread. For example, the consensus algorithm may receive checkpoint data associated with the workflow update performed by each thread. The consensus algorithm may then determine a particular use case based at least in part on a comparison of one or more respective data elements for each checkpoint data. In some embodiments, as depicted below in Table 1, there may include four primary use cases. Based on the particular determined use case, the consensus algorithm may determine a result for each calling thread, whereby the result is returned to the respective thread. As discussed further herein, the process discussed in reference to FIG. 2 may correspond to the first use case (i.e., use case 1) of Table 1, the process discussed in reference to FIG. 3 may correspond to the second use case (i.e., use case 2), and the process discussed in reference to FIG. 4 may correspond to the third use case (i.e., use case 3). In the case of use case 4, the consensus algorithm may determine respective errors for both calls (e.g., an incorrect RVN, an invalid input and/or idempotency key), and then return the errors to the respective threads. It should be understood that, although Table 1 illustrates use cases with respect to calling threads, the uses cases may also be applicable to calling hosts and/or other client types.

TABLE 1

| Use Case | Workflow Engine Behavior |
| --- | --- |
| 1 Two calls (e.g., from different threads) with the same idempotency key and the same inputs | Both threads execute all workflow steps in parallel and independently. One thread is able to write the results successfully; both threads are returned the same success result (assuming that both parallel workflows progressed successfully). |
| 2 Two calls with the same idempotency key and different inputs | First thread writes results and the second thread gets a Conflict Exception |
| 3 Two calls with different idempotency keys and the same (or different) inputs | First thread writes results and the second thread gets a Conflict Exception |
| 4 Two calls both resulting in error during synchronization | Both threads get a Conflict Exception and the workflow remains at the previous step |

Continuing with diagram 100, in some embodiments, one or more of the user device 102 and/or the workflow platform 111 may communicate with the data store 108. The data store 108 may include any suitable storage media, and may be used to store data associated with one or more workflows (e.g., via a database). For example, as described herein, the data store 108 may store the workflow graph 116. As described, further above, the workflow graph 116 may indicate one or more workflow steps of a workflow, and may include any relationships (e.g., dependencies) between workflow steps. The data store 108 may also include a workflow context, which may include any state information related to the workflow (e.g., associated with a present state of the workflow graph and/or input/output value of one or more workflow steps). For example, in a customer order fulfillment example, the workflow context may include customer order information (e.g., a customer identifier, items ordered, payment information, etc.). The workflow context may also be associated with (e.g., and/or include) a record that may be stored in the database. The record may be associated with a version number (e.g., an RVN), which may be used to keep track of the current version of the record associated with the workflow. In some embodiments, the data store 108 may enable read-only access to data, and/or read-write access to data. For example, as part of executing a particular workflow step, the user device 102 may request only read-only access to the record. In some embodiments, for example, in a case where the user device 102 writes results to the record, the workflow engine 114 may still verify those written results during the checkpoint phase. In the event of a detected error, the written results may be rolled back. In the event of success, the written results may be confirmed by the workflow engine 114 during the checkpoint. For example, the workflow engine 114 may confirm ground truth data associated with the workflow, and then transmit that confirmation (e.g., the result of the checkpoint) to the user device 102 that executed the workflow update.

Figure 2:
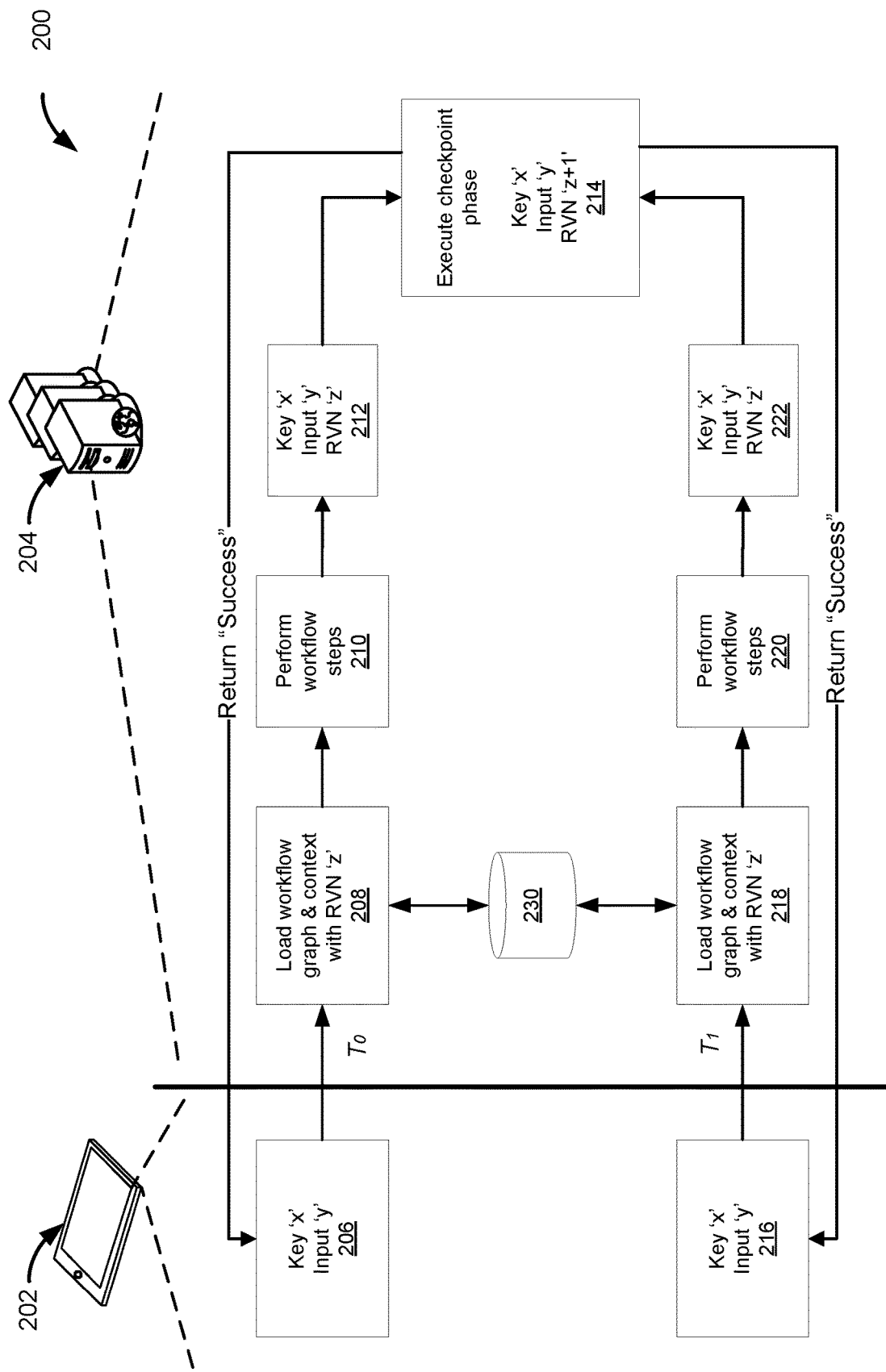
FIG. 2 is another simplified block diagram illustrating at least some example techniques for a workflow management system performing a checkpoint phase to merge updates to a workflow, according to some embodiments.

FIG. 2 is another simplified block diagram 200 illustrating at least some example techniques for a workflow platform performing a checkpoint phase to merge updates to a workflow, according to some embodiments. In diagram 200, a user device 202, a workflow management system 204, and a data store 230 are depicted. The user device 202 may be similar to user device 102 of FIG. 1, the workflow management system 204 may be similar to workflow management system 106, and the data store may be similar to data store 108. FIG. 2 depicts an example high-level process for the workflow management system 204 to merge updates by executing a consensus algorithm during a checkpoint phase. In the process depicted in diagram 200, the consensus algorithm determines that the scenario corresponds to first use case of Table 1, based on checkpoint data received from each parallel update to the workflow.

In diagram 200, two clients (e.g., threads) are depicted, which may both be executed in parallel on user device 202. For example, consider an earlier illustration in which the user device 202 is used as part of a customer order fulfillment process. In this example, suppose that, upon obtaining bin 104, scanning item ABCDE, and scanning item ABC123 (e.g., corresponding to completion of the new workflow steps 132 displayed by GUI 110 of FIG. 1), the user device 202 then spawns a first thread at block 206. Note that, although at this point, a second parallel thread may not yet have been spawned, the workflow management system may determine to allow parallel execution of a workflow step of the workflow by a plurality of threads. For example, the first thread (and/or an associated workflow instance) may not acquire a lock associated with the workflow to block another workflow instance of the workflow from executing. It should be understood that, as described herein, an execution of a workflow step (e.g., a workflow update) by a particular thread of the plurality of threads may include the thread calling the runtime API (e.g., runtime API 112) to create a new runtime workflow instance (e.g., a workflow update process) that executes on the workflow management system 204. In this case, the workflow instance may perform one or more operations of the workflow update on behalf of the thread. In some embodiments, the thread may invoke the runtime API 112 to execute one or more operations corresponding to the workflow update (e.g., via the runtime workflow instance). Accordingly, although the some of the blocks of diagram 200 are described as being performed by a thread of the user device 202, it should be understood that one or more of those operations (e.g., one or more operations of block 208, block 210, block 212, and/or block 214) may be performed by a workflow instance on behalf of the first thread, or any suitable combination thereof (and, similarly, for the second thread, described below).

At block 206, the first thread determines a first idempotency key with a first key value (e.g., 'x,' which may represent any suitable key value). The first thread also determines a first input (e.g., 'y,' which may represent the unique serial number of the particular item of type "ABC123").

At block 208, the first thread (and/or an associated first runtime workflow instance) may then execute one or more calls to the runtime API of the workflow platform of workflow management system 204. In some embodiments, the operations of block 208 may occur at time $T_0$. For example, the first thread may execute a call to load the workflow graph of the workflow being updated (e.g., the customer order fulfillment workflow). This call may, in turn, cause the workflow graph to be retrieved from the data store 230 (e.g., which may be similar to data store 108 of FIG. 1) and loaded into the workflow instance. The first thread may further retrieve the workflow context from the data store 230, which may include loading the RVN of the particular record associated with the workflow (which also may be known as the "first record version identifier" or "first RVN"). In this example, the first RVN may have a value of 'z,' which may represent any suitable record version number.

At block 210, the first thread (and/or the associated first runtime workflow instance) may perform one or more workflow steps that correspond to a first update for the workflow. For example, the first thread may read the current record to determine what items are already listed as being added to bin 104 of FIG. 1. Upon confirming that an item of type "ABC123" still has not been added (e.g., the workflow step has not yet been performed), the first thread may then write to the record, indicating that an item of type "ABC123" has been added to the bin 104. It should be understood that any suitable number of one or more workflow steps may be performed for a given update, and each workflow step may involve one or more computing operations (e.g., reads from memory, writes to memory, and/or combinations thereof).

At block 212, the first thread (and/or the associated first runtime workflow instance) may determine first checkpoint data for a later checkpoint phase performed by the workflow engine of the workflow management system 204. In some embodiments, the first checkpoint data associated with the first update may include: (1) the first input, (2) the first idempotency key, and (3) the first RVN.

At block 214, the first thread (and/or the associated first runtime workflow instance) may call the workflow engine (e.g., workflow engine 114 of FIG. 1) to execute a checkpoint phase. The workflow engine may then receive the first checkpoint data determined from block 212, and initiate the checkpoint phase. During the checkpoint phase, the workflow engine may retrieve a current record version identifier (e.g., a current RVN) that corresponds to a current version of the particular record associated with workflow update. The workflow engine may then compare the first RVN of the first checkpoint data (e.g., previously retrieved at block 208) with the current RVN. For example, suppose that the current RVN still has a value of 'z,' which matches the first RVN's value. In this case, the workflow engine may determine that the values match. Accordingly, the workflow engine may update the current RVN (i.e., determining an updated current record version identifier) by incrementing the current RVN to be 'z+1.'

At block 216, suppose that the first thread experiences a network error. For example, suppose that, sometime in between one of the operations of block 208 and block 214, the network connection between the first thread and the workflow management system 204 is lost. As described herein, in some embodiments, even if the network connection between the first thread and the workflow management system 204 is broken, the corresponding workflow instance executing on the platform may still continue (e.g., transparent to the first thread) to execute one or more of the operations of blocks 208 through block 214 to enter the checkpoint phase. In this case, with a broken network connection, the user device 202 (e.g., via a user application that controls GUI 110) may spawn the second thread to retry the workflow update. Note that this retry process may be transparent to a user of the user application (e.g., not exposed via the GUI 110). For example, the user device 202 may have already scanned the item, and the user may be waiting for a confirmation (e.g., via a check box displayed in GUI 110) that the update was successfully registered by the system, so that the user device 202 may prompt the user to complete the next workflow step of the workflow. In this retry case, the second thread may utilize a second idempotency key that has the same idempotency key value (e.g., 'x') as the first thread, and a second input that has the same input value (e.g., 'y') as the first thread.

At block 218, the second thread (and/or an associated second runtime workflow instance) may execute one or more operations similar to block 208. In some embodiments, the operations of block 218 may occur at time $T_1$, which may be after time $T_0$. For example, in some embodiments, at block 218, the checkpoint phase of block 214 may still be in progress and the workflow engine may have already received and processed the first checkpoint data associated with the first thread (e.g., the current RVN is already incremented to reflect the update to the record). However, because the first thread's update has not yet been committed (e.g., written to the data store 230) by the system during the checkpoint phase, the second RVN (e.g., the "second record version identifier" retrieved with the workflow context) may have a value of 'z' (e.g., not reflecting the incremented RVN). In another embodiment, at time $T_1$, the operations of block 218 may occur even before the checkpoint phase of block 214 increments the RVN to be 'z+1,' and thus, the second RVN retrieved from the data store 203 may have a value of 'z.' In any case, in this example, the operations of the second runtime workflow (associated with the second thread) lag behind the operations of the first runtime workflow (associated with the first thread), based in part on the second runtime workflow (i.e., the "retry" thread) executing after the first runtime workflow.

At block 220, the second thread (and/or the associated second runtime workflow instance) may execute one or more operations similar to block 210. In this case, the second thread may execute the operations for performing a second update that corresponds to the same one or more workflow steps associated with the first update.

At block 222, the second thread (and/or the associated second runtime workflow instance) may execute one or more operations similar to block 212. For example, the second thread may determine second checkpoint data for merging of the first update and the second update during the checkpoint phase. The second checkpoint data may include: (1) the second input, (2) the second idempotency key, and (3) the second RVN.

Returning to block 214, the workflow engine may receive the second checkpoint data determined from block 222. The workflow engine may then execute the consensus algorithm to merge the updates to the workflow by comparing data elements of the first checkpoint data with one or more respective data elements of the second checkpoint data. For example, in the case of the scenario depicted by diagram 200 of FIG. 2, the workflow engine may determine that the first input matches the second input, and the first idempotency key matches the second idempotency key. Based on this determination, the workflow engine may determine that the second update corresponds to a retry of the first update (i.e., they both correspond to the same update). Accordingly, the workflow engine may determine a result of "Success" for both updates. Upon determining the result, the workflow engine may complete the checkpoint phase, and then return (e.g., transmit) the "Success" result to at least one of the first thread or the second thread. As described herein, it should be understood that, even though the first update (e.g., associated with the first thread) may be the update that is actually written to the record (e.g., because the first thread was the first to initiate the checkpoint phase, with the first RVN matching the current RVN), the workflow engine may not know which thread is actively waiting for a result. For example, the workflow engine may not know if the waiting thread is the second thread (e.g., associated with the second update) or another thread that may have timed out or experienced another network error (e.g., the first thread, associated with the first update). Accordingly, the workflow engine may return a "Success" result to both threads, thus enabling the user device 202 to proceed with updating the GUI 110 (e.g., prompting the user to complete a next step). In some embodiments, even though both threads receive a "Success" result, the underlying threads may execute transparent to a user of the GUI 110. Accordingly, the user device 202 may utilize at least one of the first result or the second result for presenting a single success indicator (e.g., a green light or a checked box) to the GUI 110. It should be understood that any suitable data may be communicated by the workflow engine to the threads, including, but not limited to, instructions for next workflow steps to be completed, success/error codes, a request for more input from the user, etc. It should also be understood that, in this first use case, the workflow engine may not need to compare the first RVN (e.g., of the first checkpoint data) with the second RVN (e.g., of the second checkpoint data). For example, note that the current record version identifier (e.g., current RVN) was incremented to 'z+1' in an earlier operation of block 214 associated with the first checkpoint data (e.g., because the first workflow instance first executed (at time $T_0$ and was the first to reach the checkpoint phase). Accordingly, although the second record version identifier (e.g., the second RVN) of the second checkpoint data may still have a value of 'z' (e.g., which does not match the updated 'z+1' value), the workflow engine may nevertheless determine that the two updates are the same, based on the matching input values and idempotency keys of the respective checkpoint data elements.

Figure 3:
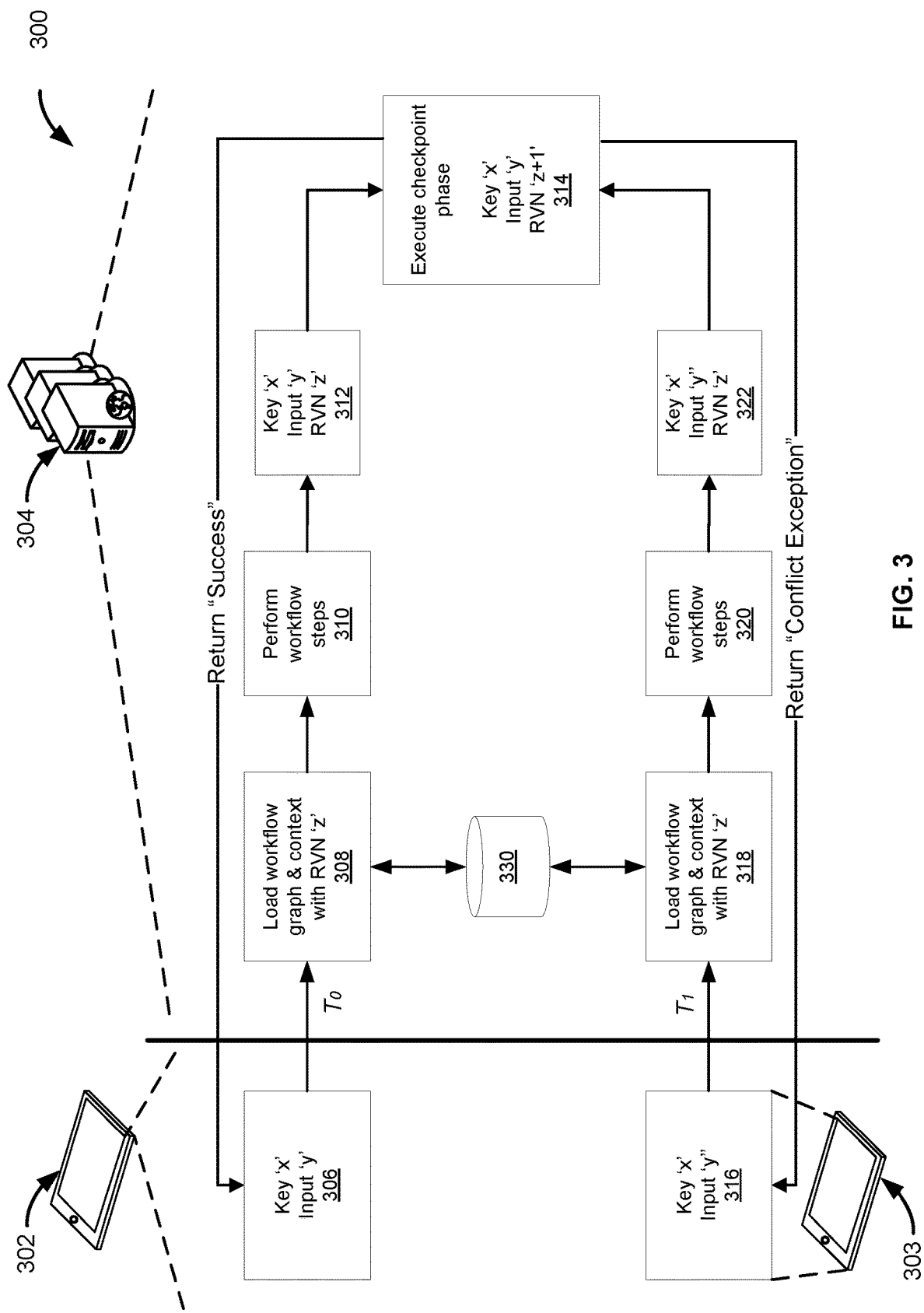
FIG. 3 is another simplified block diagram illustrating at least some example techniques for a workflow management system performing a checkpoint phase to merge updates to a workflow, according to some embodiments.

FIG. 3 is another simplified block diagram illustrating at least some example techniques for a workflow platform performing a checkpoint phase to merge updates to a workflow, according to some embodiments. In diagram 300, a user device 302, a user device 303, a workflow management system 304, and a data store 330 are depicted. Each of the user devices may be similar to user device 102 of FIG. 1, the workflow management system 304 may be similar to workflow management system 106, and the data store 230 may be similar to the data store 330. FIG. 3 depicts an example high-level process for the workflow management system 304 to merge updates by executing a consensus algorithm during a checkpoint phase. In the process depicted in diagram 300, the consensus algorithm determines that the scenario corresponds to the second use case of Table 1, based on checkpoint data received from each parallel update to the workflow.

As noted above, in the illustration of FIG. 3, two user devices (e.g., hosts) are depicted. For example, consider a scenario illustrating the second use case in which two customer order fulfillment agents are obtaining items and placing them into bin 104 for a particular customer order. Each agent may utilize a different user device (e.g., user device 302 (a "first host"), user device 303 (a "second host") to perform and record different workflow steps. In this example, suppose that user device 302 prompts a respective first agent to perform a first workflow step that involves obtaining and placing an item of type "ABC123" into the bin 104. The item has a unique serial number that corresponds to a value ('y') of a first input. Furthermore, suppose that user device 303 prompts a respective second agent to perform a second workflow step that involves obtaining and placing a different item that has the same type "ABC123" into the bin 104 (e.g., with another unique serial number that corresponds to a second input value ('y',' that is different from 'y')). In this example, similar to the example of FIG. 2, suppose that a first update of the user device 302 begins executing at time $T_0$ (see block 308 below), and a second update of the user device 303 begins executing after time $T_1$ (see block 318 below), which is after $T_0$. Although $T_1$ follows $T_0$, both updates are allowed to be executed in parallel, as described herein. Also, suppose that, when each user device attempts to update the workflow, the idempotency key assigned to the update is programmed (e.g., by an administrator) to match the item type of the item. In this case, since both items (for the respective workflow steps) have the same type, the idempotency key values for the updates are the same (i.e., 'x'). In some embodiments, this type of scenario may correspond to a human and/or system error, since a particular update may be required have a unique assigned idempotency key. In some embodiments, the workflow engine may resolve this type of error during the checkpoint phase by determining a "winning" and "losing" host via the consensus algorithm, as described further below.

Turning to the process illustrated by FIG. 3 in further detail, at block 306, the user device 302 (e.g., the first host) scans the first item of type "ABC123" (e.g., corresponding to the next workflow step displayed by a GUI-based application of user device 302). In this example, for clarity of illustration, suppose that this workflow step is the only workflow step being performed between checkpoints. Accordingly, upon scanning the item, the user device 302 (e.g., via the GUI-based application, and/or associated thread) may determine a first idempotency key with a first key value 'x' (e.g., which, as described above, may correspond to the item type "ABC123"). The user device 302 also determines a first input (e.g., 'y,' which may represent the unique serial number of the first item).

At block 308 (e.g., time $T_0$), the user device 302 (e.g., and/or a corresponding first runtime workflow instance, similar to as described in reference to FIG. 2) may then execute a call to load (e.g., from the data store 330) the workflow graph and the workflow context of the workflow being updated. This may also include retrieving the RVN of the particular record associated with the workflow (the "first RVN"). In this example, the first RVN may have a value of 'z,' which may represent the current record version number. Note that, similar to the process of FIG. 2, the user device 302 (and/or associated runtime workflow instance) has not acquired a lock from the workflow platform. The workflow management system may determine to allow parallel execution of a workflow step of the workflow by a plurality of hosts.

At block 310, the user device 302 (and/or the associated first runtime workflow instance) may perform one or more workflow steps that correspond to a first update for the workflow. In some embodiments, one or more operations of block 310 may be similar to as described in reference to block 210 of FIG. 2.

At block 312, the user device 302 (and/or the associated first runtime workflow instance) may determine first checkpoint data for a later checkpoint phase performed by the workflow engine of the workflow management system 304. In some embodiments, the first checkpoint data associated with the first update may include: (1) the first input, (2) the first idempotency key, and (3) the first RVN.

At block 314, the user device 302 (and/or the associated first runtime workflow instance) may call the workflow engine (e.g., workflow engine 114 of FIG. 1) to execute a checkpoint phase. In some embodiments, the workflow engine may receive the first checkpoint data from block 314, and initiate the checkpoint phase. During the checkpoint phase, similar to block 214 of FIG. 2, the workflow engine may retrieve a current RVN that corresponds to a current version of the particular record associated with workflow update. The workflow engine may then compare the first RVN of the first checkpoint data (e.g., previously retrieved) with the current RVN. For example, suppose that the current RVN still has a value of 'z,' which matches the first RVN's value. In this case, the workflow engine may determine that the values match. Accordingly, the workflow engine may update the current RVN by incrementing the current RVN to be 'z+1.' Although, as depicted in FIG. 3, the first update of user device 302 (e.g., the first host) reaches the checkpoint phase first, it should be understood that embodiments are not so limited. For example, in another embodiment, the second update of the second host (e.g., user device 303), described further below, may reach the checkpoint phase first (e.g., if the second update started execution at an earlier time than the first update, in which case the "winner" and "loser" host update may be reversed from as described herein).

At block 316, the user device 303 (e.g., the second host) may scan the second item of type "ABC 123" (e.g., the same type as the first item scanned by the first host at block 306). Upon scanning the item, the user device 303 may determine a second idempotency key with a second key value of 'x' (i.e., the same idempotency key as determined at block 306, which may correspond to "ABC 123"). The user device 303 also determines a second input (e.g., 'y',' which may represent the different serial number of the second item (i.e., different from 'y')).

At block 318 (e.g., time $T_1$ that follows time $T_0$), the user device 303 (e.g., and/or a corresponding runtime workflow instance, similar to as described in reference to FIG. 2) may then execute a call to load the workflow graph and the workflow context of the workflow being updated. This may also include retrieving the RVN of the particular record associated with the workflow (the "second RVN"). In this example, the second RVN may have a value of 'z,' which may represent the record version number of the particular record stored in data store 330. Note that, in this example, similar to as described in block 218 of FIG. 2, the checkpoint phase of block 314 is still in progress and the workflow engine may have already received and processed the first checkpoint data associated with the first host (e.g., the current RVN is already incremented to reflect the update to the record). However, because the first host's update has not yet been committed (e.g., confirmed) by the system during the checkpoint phase, the second RVN (e.g., the "second record version identifier" retrieved with the workflow context) may have a value of 'z' (e.g., not reflecting the incremented RVN). In another embodiment, the operations of block 318 may occur even before the checkpoint phase of block 314 increments the RVN to be 'z+1,' and thus, the second RVN retrieved from the data store 330 may have a value of 'z.' In any case, in this example, the second RVN may be different (e.g., less) than the updated (e.g., incremented) current RVN. In any case, in this example, the operations of the second runtime workflow (associated with the user device 303) lag behind the operations of the first runtime workflow (associated with the user device 302).

At block 320, the user device 303 (e.g., and/or a corresponding second runtime workflow instance) may execute operations for performing a second update that corresponds to one or more workflow steps. In some embodiments, the one or more workflow steps may be similar to or different from the workflow steps of block 310. In some embodiments, the workflow steps may involve a read-only operation from the data store 330, whereby a conflict is not detected by the second host. Note that a conflict may have been detected by the second host during a write operation, in which case the write may have failed (e.g., and the host (or workflow instance) may return a conflict exception), when trying to use the same idempotency key with a different input.

At block 322, the user device 303 may (e.g., and/or a corresponding second runtime workflow instance) may determine second checkpoint data for merging of the first update and the second update during the checkpoint phase. The second checkpoint data may include: (1) the second input, (2) the second idempotency key, and (3) the second RVN.

Returning to block 314, the workflow engine may receive the second checkpoint data determined from block 322. The workflow engine may then execute the consensus algorithm to merge the updates to the workflow by comparing data elements of the first checkpoint data with one or more respective data elements of the second checkpoint data. For example, in the case of the scenario depicted by diagram 300 of FIG. 3, the workflow engine may determine that the first idempotency key matches the second idempotency key, but the first input does not match the second input. Based on this determination, the workflow engine may determine that the second use case of Table 1 has occurred, and therefore may return a conflict exception to the second host (user device 303). Note that, in this case, the consensus algorithm may determine that the first host (user device 302) is the "winner" and the second host should receive the "conflict exception" based in part on the second RVN ('z') of the second host not matching the current RVN (z+1'), which was incremented from the first update of the first host. For example, in this case, the first runtime workflow reached the checkpoint phase first based at least in part on the first runtime workflow of user device 302 executing first (e.g., at time $T_0$). This prompted the RVN to be incremented to 'z+1,' thus "beating out" the user device 303 that executed later (e.g., at time $T_1$) and subsequently reached the checkpoint phase after the first runtime workflow. In some embodiments, this method of using RVN's to determine a "winner" and "loser" when updating a record may be known as "optimistic locking," whereby a party may update a record if the RVN maintained server-side (e.g., by the workflow platform) has not already been updated by another party. Note that, even with optimistic locking, no exclusive lock may be acquired by either the first host or the second host.

Upon the consensus algorithm determining a conflict exception at block 314, in addition to the workflow engine returning a conflict exception to the second host (e.g., user device 303), the workflow engine may also return a "Success" indicator to the first host (e.g., user device 302). In another embodiment, instead of (and/or in addition to) returning a conflict exception to the second host, the workflow engine may prompt the second host to resolve the merge conflict. For example, the second host may automatically (or, with manual user input) determine that the first and second update are different updates that involve different items of the same type. Upon the second host providing input to resolve the merge conflict, the workflow platform may then complete the checkpoint phase.

Although the above describe process of FIG. 3 depicts the workflow platform resolving a merge conflict among parallel-executing workflow updates, it should be understood that, in some embodiments, each host may be able to detect if a workflow step conflict happens during a workflow update, even before the workflow engine is called upon to resolve this type of error during the checkpoint phase. For example, during an execution of a particular workflow step (e.g., writing to the data store 330 at block 320), a workflow instance (e.g., on behalf of host) may detect (e.g., via an error returned by an attempted database access) that the update is invalid. For example, the data store 330 may return an error upon detecting that the idempotency key for the update is the same as another update (e.g., performed by another host) with the same idempotency key value, but with a different input. In this case, the host (and/or the workflow instance executed on behalf of the host) may determine the error condition, and return a conflict exception. In this case, the checkpoint phase may not be needed to resolve a merge conflict. However, in cases where a host (and/or runtime workflow instance) does not detect the error (e.g., an update corresponding to a read-only workflow step), the workflow engine may execute the consensus algorithm to catch and resolve the exception (e.g., as a failsafe exception handling mechanism), thus ensuring that the platform maintains accurate data (e.g., workflow graph and/or context data) for each workflow.

Figure 4:
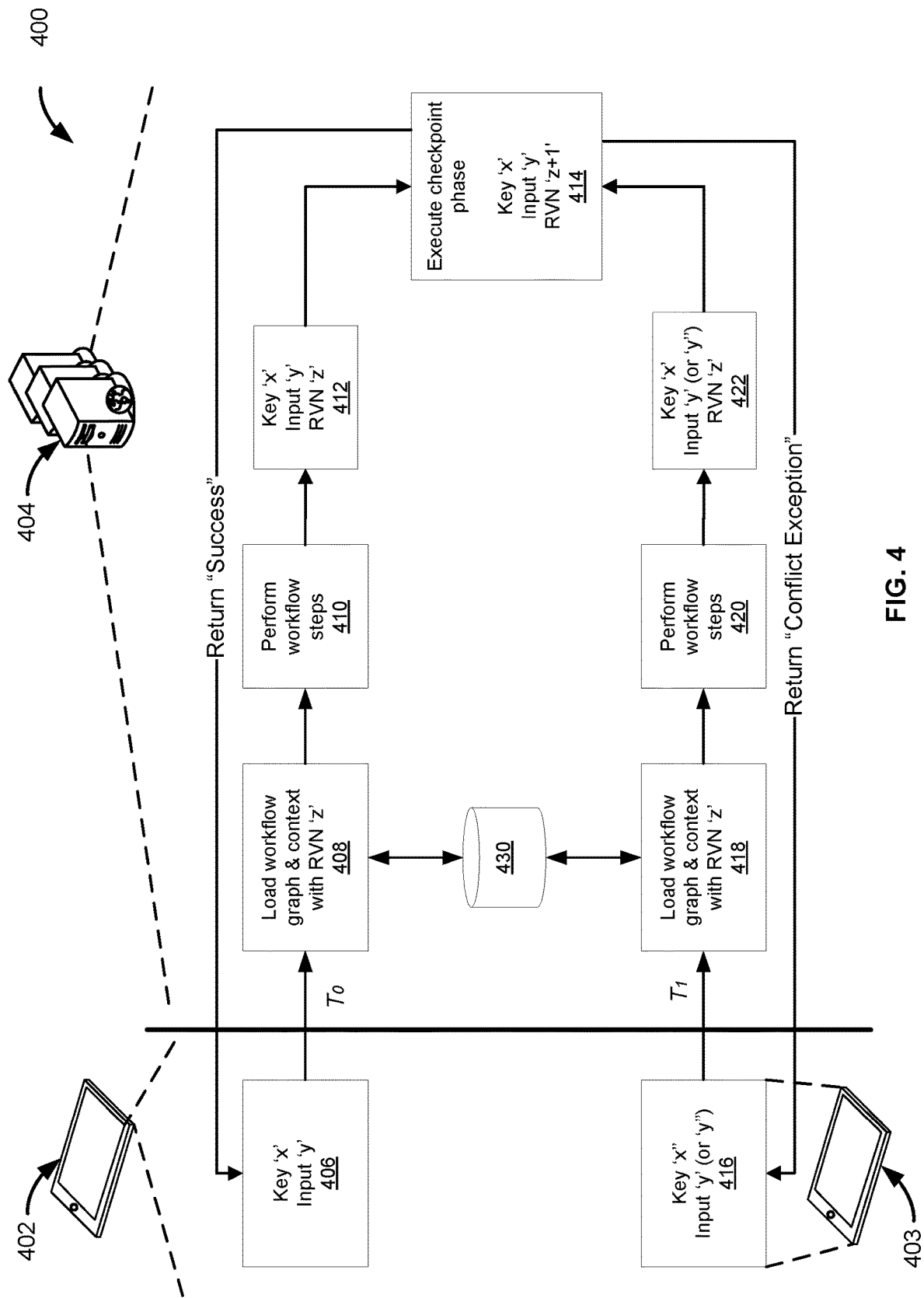
FIG. 4 is another simplified block diagram illustrating at least some example techniques for a workflow management system performing a checkpoint phase to merge updates to a workflow, according to some embodiments.

FIG. 4 is another simplified block diagram illustrating at least some example techniques for a workflow platform performing a checkpoint phase to merge updates to a workflow, according to some embodiments. The elements depicted in diagram 400 may include a user device 402, a user device 403, a workflow management system 404, and a data store 430, which may be respectively similar to the elements of diagram 300 of FIG. 3. In the process depicted in diagram 400, the consensus algorithm executed by the workflow engine during the checkpoint phase determines that the scenario corresponds to the third use case of Table 1, based on checkpoint data received from each parallel update to the workflow. In this case, the idempotency keys are different, while the inputs may match (e.g., have equal values) or be different. The consensus algorithm may determine that the updates are not the same based on the idempotency keys being different. The consensus algorithm may further determine a "winning" host (e.g., between parallel updates of the two hosts) based on a comparison of RVNs, similar to the process of FIG. 3. Also, similar to the process of FIG. 3, upon determining the winning host and the host associated with a conflict exception, the workflow platform may return respective results (e.g., "Success," "Error") to each host. In the third use case, as described herein, because the idempotency keys between the parallel (e.g., concurrent) executing updates are different, the updates may be interpreted by the workflow platform as being entirely different updates (e.g., even if they are in fact they are intended to be the same update, but a programmatic error somehow caused the idempotency keys to be different). Accordingly, and similar to the second use case, in the case where the respective host (or thread, as the case may be) does not catch the exception during the runtime execution of the workflow update, the workflow platform may serve as a fallback mechanism to determine the conflict exception during the merge (e.g., the consensus algorithm) of the checkpoint phase.

Turning to the process illustrated by FIG. 4 in further detail, at block 406, the user device 402 (e.g., the first host) scans the first item of type "ABC123" (e.g., corresponding to the next workflow step displayed by a GUI-based application of user device 402). In this example, similar to FIG. 3, suppose that this workflow step is the only workflow step being performed between checkpoints. Accordingly, upon scanning the item, the user device 402 (e.g., via the GUI-based application, and/or associated thread) may determine a first idempotency key with a first key value 'x.' The user device 302 also determines a first input (e.g., 'y,' which may represent the unique serial number of the first item).

At block 408 (e.g., time $T_0$), the user device 402 (e.g., and/or a corresponding first runtime workflow instance, similar to as described in reference to FIG. 3) may then execute a call to load (e.g., from the data store 430) the workflow graph and the workflow context of the workflow being updated. This may also include retrieving the RVN of the particular record associated with the workflow (the "first RVN"). In this example, the first RVN may have a value of 'z,' which may represent any suitable record version number. Note that, similar to the process of FIGS. 2 and 3, the user device 402 (and/or associated runtime workflow instance) has not acquired a lock from the workflow platform. The workflow management system may determine to allow parallel execution of a workflow step of the workflow by a plurality of hosts.

At block 410, the user device 402 (and/or the associated first runtime workflow instance) may perform one or more workflow steps that correspond to a first update for the workflow. In some embodiments, one or more operations of block 410 may be similar to as described in reference to block 310 of FIG. 3.

At block 412, the user device 402 (and/or the associated first runtime workflow instance) may determine first checkpoint data for a later checkpoint phase performed by the workflow engine of the workflow management system 404. In some embodiments, the first checkpoint data associated with the first update may include: (1) the first input, (2) the first idempotency key, and (3) the first RVN.

At block 414, the user device 402 (and/or the associated first runtime workflow instance) may call the workflow engine (e.g., workflow engine 114 of FIG. 1) to execute a checkpoint phase. In some embodiments, the workflow engine may receive the first checkpoint data from block 414, and initiate the checkpoint phase. During the checkpoint phase, similar to block 314 of FIG. 3, the workflow engine may retrieve a current RVN that corresponds to a current version of the particular record associated with workflow update. The workflow engine may then compare the previously retrieved first RVN of the first checkpoint data with the current RVN. For example, suppose that the current RVN still has a value of 'z,' which matches the first RVN's value. In this case, the workflow engine may determine that the values match. Accordingly, the workflow engine may update the current RVN by incrementing the current RVN to be 'z+1.' Although, as depicted in FIG. 4, the first update of user device 402 (e.g., the first host) reaches the checkpoint phase first, it should be understood that embodiments are not so limited. For example, in another embodiment, the second update of the second host (e.g., user device 403), described further below, may reach the checkpoint phase first (e.g., if the second update started execution at an earlier time than the first update, in which case the "winner" and "loser" host update may be reversed from as described below).

At block 416, the user device 403 (e.g., the second host) may scan the second item of type "ABC 123" (e.g., the same type as the first item scanned by the first host at block 306). Upon scanning the item, the user device 403 may determine a second idempotency key with a second key value of 'x' (i.e., a different idempotency key from the first idempotency key ('x') determined at block 406). The user device 303 also determines a second input (e.g., 'y',' which may represent a different unique serial number of the second item). As described above, in some embodiments, instead of the second input being a different value from the first input, the second input may instead correspond to the same value as the first input ('y'). For example, similar to the first use case, both the first input and the second input may be the same value, in the case of a retry scenario. In this example, there may instead be two different threads executing updates in parallel on the same user device. However, in contrast to the first use case, in this example, the first idempotency key ('x') and the second idempotency key ('x") are different (e.g., due to a system malfunction or other programmatic error), and so the consensus algorithm may not be able to determine that the two updates are in fact the same.

At block 418 (e.g., time $T_1$ that follows time $T_0$), the user device 403 (e.g., and/or a corresponding second runtime workflow instance, similar to as described in reference to FIG. 2) may then execute a call to load the workflow graph and the workflow context of the workflow being updated. This may also include retrieving the RVN of the particular record associated with the workflow (the "second RVN"). In this example, the first RVN may have a value of 'z.' Note that, in this example, similar to block 318 of FIG. 3, the checkpoint phase of block 314 is still in progress and the workflow engine may have already received and processed the first checkpoint data associated with the first host (e.g., the current RVN is already incremented to reflect the update to the record). However, because the first host's update has not yet been committed (e.g., confirmed) by the system during the checkpoint phase, the second RVN (e.g., the "second record version identifier" retrieved with the workflow context) may have a value of 'z' (e.g., not reflecting the incremented RVN). In another embodiment, the operations of block 418 may occur even before the checkpoint phase of block 414 increments the RVN to be 'z+1,' and thus, the second RVN retrieved from the data store 430 may have a value of 'z.' Similar to as described in FIG. 3, in this example, the operations of the second runtime workflow (associated with the user device 403) lag behind the operations of the first runtime workflow (associated with the user device 402).

At block 420, the user device 403 (e.g., and/or the corresponding second runtime workflow instance) may execute operations for performing the second update that corresponds to one or more workflow steps. In some embodiments, the one or more workflow steps may be similar or different from the workflow steps of block 410 (e.g., depending on whether the updates are the same or different). As described in reference to block 320 of FIG. 3, in some embodiments, the workflow steps may involve a read-only operation, whereby a conflict is not detected by the second host. Note that a conflict may have been detected by the second host during a write operation to the database of data store 430, in which case the write may have failed (e.g., and the host (or workflow instance) may return a conflict exception), when trying to use a different idempotency key with a same (or different) input.

At block 422, the user device 403 may (e.g., and/or the corresponding second runtime workflow instance) may determine second checkpoint data for merging of the first update and the second update during the checkpoint phase. The second checkpoint data may include: (1) the second input, (2) the second idempotency key, and (3) the second RVN.

Returning to block 414, the workflow engine may receive the second checkpoint data determined from block 422. The workflow engine may then execute the consensus algorithm to merge the updates to the workflow by comparing data elements of the first checkpoint data with one or more respective data elements of the second checkpoint data. For example, in the case of the scenario depicted by diagram 400 of FIG. 4, the workflow engine may determine that the first idempotency key does not match the second idempotency key. Based on this determination, the workflow engine may determine that the third use case of Table 1 has occurred, and therefore may determine a result corresponding to a conflict exception. The workflow engine may then complete the checkpoint phase and return a conflict exception to the second host. Note that, in this case, the consensus algorithm may determine that the first host is the "winner" and that the second host should receive the "exception" based in part on the second RVN ('z') of the second host not matching the current RVN (z+1'), which was incremented from the first update of the first host. For example, in this case, and, similar to FIG. 3, based at least in part on the first runtime workflow of user device 402 executing first (e.g., at time $T_0$), it reached the checkpoint phase first, which prompted the RVN to be incremented to 'z+1,' thus "beating out" the user device 403 that executed later (e.g., at time $T_1$).

In some embodiments, and, similar to as described in reference to block 314 of FIG. 3, upon the consensus algorithm determining a conflict exception at block 414, the workflow engine may also return a "Success" indicator to the first host (e.g., user device 402). Also, in another embodiment, instead of (and/or in addition to) returning a conflict exception to the second host, the workflow engine may prompt the second host to resolve the merge conflict. For example, the second host may automatically (or, with manual user input) determine that the first and second update are different updates that involve different items of the same type. Upon the second host providing input to resolve the merge conflict, the workflow platform may then complete the checkpoint phase. It should be understood that a checkpoint phase may be determined to be completed at any suitable point following the completion of the consensus algorithm to determine one or more results (e.g., success and/or a conflict exception).

Figure 5:
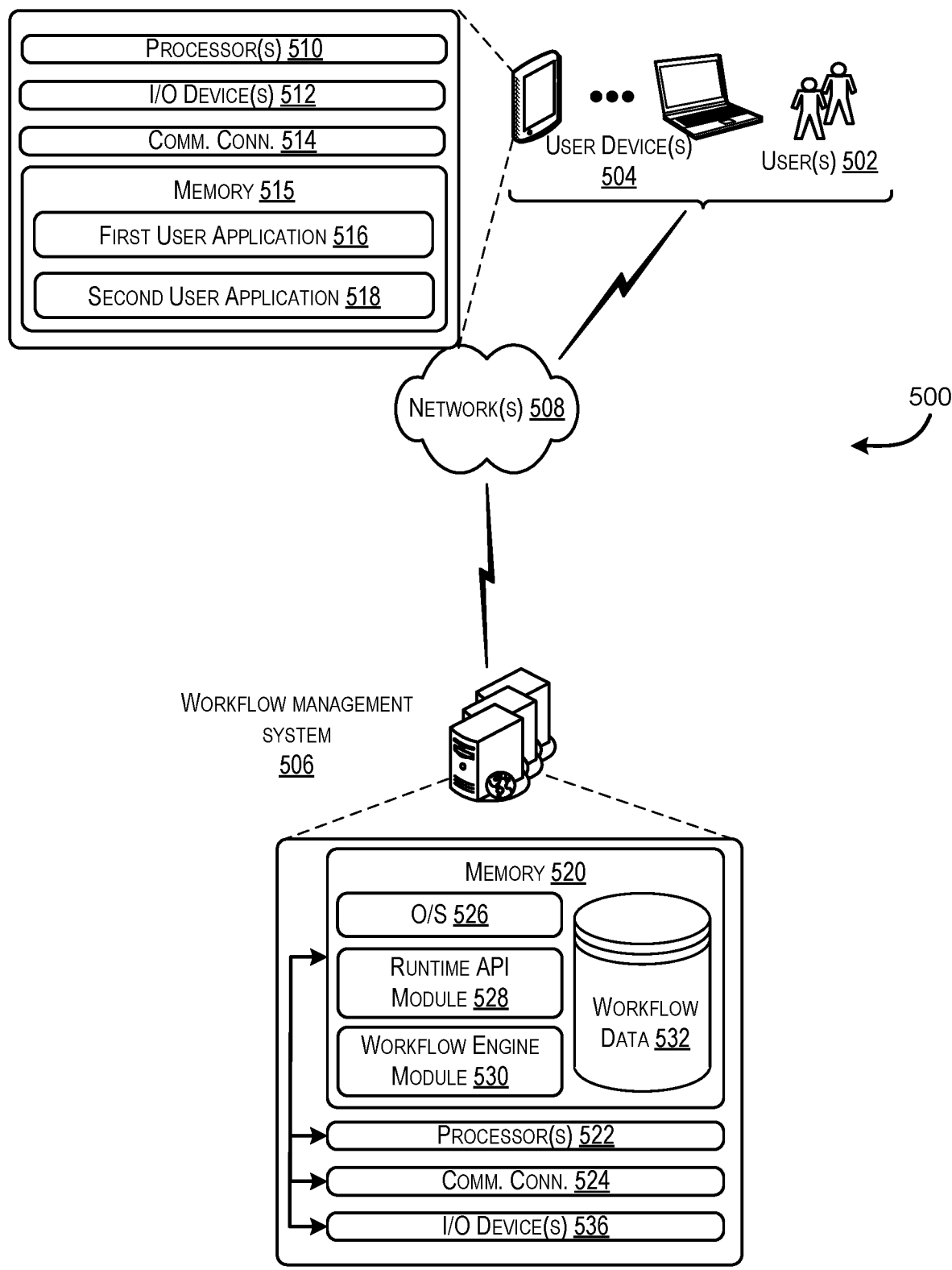
FIG. 5 is another simplified block diagram illustrating an example architecture of a system used to perform a checkpoint phase to merge updates to a workflow, according to some embodiments.

FIG. 5 is another simplified block diagram illustrating an example architecture of a system used to perform a checkpoint phase to merge updates to a workflow, according to some embodiments. The diagram 500 includes one or more user devices 504 (or "hosts"), whereby each user device may be associated with a particular one or more users 502 (e.g., a fulfillment agent, a customer, etc.). Each of the one or more user devices 504 may be similar to any of the user devices described herein. The diagram 500 also includes a network 508 and a workflow management system 506 (e.g., which may be similar to any of the workflow management systems described herein).

Turning to user device 504 in further detail, the user device 504 may be any suitable computing device that is capable communicating with the workflow management system 506 to initiate and/or execute performance of a workflow update, according to embodiments described herein. In some non-limiting examples, a user device may be a tablet device, a PC, a mobile phone, etc. In some embodiments, the user device 504 may contain at least one or more processing units (or processor(s)) 510, an input/output (I/O) device(s) 512, a communications connection interface 514, and a memory 515.

The memory 515 may store program instructions that are loadable and executable on the processor(s) 510, as well as data generated during the execution of these programs. The memory 515 may be volatile (such as random access memory (RAM)) and/or non-volatile (such as read-only memory (ROM), flash memory, etc.). In some implementations, the memory 515 may include multiple different types of memory, such as static random access memory (SRAM), dynamic random access memory (DRAM) or ROM. The user device 504 may also include additional storage, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the user device 504 may also include I/O device(s) 512, such as for enabling connection with a keyboard, a mouse, a pen, a voice input device, a touch input device, a display, speakers, a printer, etc. The user device 504 may also contain the communications connection interface 514 that allows the user device 504 to communicate with a stored database (e.g., within a workflow data store 532 of the workflow management system 506), another computing device or server (e.g., the workflow management system 506), user terminals, and/or other devices on the network(s) 508.

Turning to the contents of the memory 515 in more detail, the memory 515 may include an operating system and one or more application programs or services for implementing the features disclosed herein, including a first user application 516 and a second user application 518. In some embodiments, each user application may comprise code that causes the processor 510 to execute one or more operations associated with a workflow update. For example, the first user application 516 may correspond to a first web browser client (e.g., a first browser tab) that may be used to perform one or more operations associated with enabling a user (e.g., user 502) to complete a customer order (e.g., adding items to a digital shopping cart, inputting payment information, submitting the order for processing, etc.). Meanwhile, the second user application 518 may correspond to a second web browser client (e.g., a second browser tab). In this example, the second browser tab may be used to perform a retry of the customer order (e.g., in case the first tab lost a network connection). In some embodiments, the scenario may be similar to the first use case of Table 1. In another example, the user device 504 may correspond to a tablet that is used by a fulfillment agent to execute one or more workflow steps of a customer order (e.g., similar to user device 102 of FIG. 1). In this example, the first user application 516 may be a GUI application that presents a GUI similar to GUI 110 of FIG. 1. In the event of a retry scenario whereby a first spawned thread may have a broken connection with the network 508 (e.g., the first use case of Table 1), the first user application 516 may spawn another second thread to perform the retry. As described herein, it should be understood that any suitable combination of client applications, threads, and/or hosts (e.g., devices) may be utilized to perform embodiments described herein.

The network 508 may include any suitable communication path or channel such as, for instance, a wire or cable, fiber optics, a telephone line, a cellular link, a radio frequency (RF) link, a WAN or LAN network, the Internet, or any other suitable medium. The network 508 may include any one or a combination of many different types of networks, such as cable networks, the Internet, wireless networks, cellular networks, and other private and/or public networks.

Turning to the workflow management system 506 in further detail, the workflow management system 506 may include a memory 520, a processor 522, a storage 524, a communications connection interface 534, and an I/O device (s) 536. In some embodiments, each of these elements may be similar (or different) from respective elements described in reference to user device 504. In some embodiments, the elements of the workflow management system 506 may be included within one or more server computers (e.g., server clusters) that form a distributed computing system. In some embodiments, the memory 520 may also include (and/or be associated with) the workflow data store 532. In some embodiments, the workflow data store 532 may be similar to the data store 108 of FIG. 1. In some embodiments, the workflow data store 532 may correspond to removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the workflow data store 532 may store any suitable data related to managing a workflow, including, but not limited to, one or more workflow graphs, a database of records, a workflow context for a given workflow, etc.

Turning to the contents of the memory 520 in more detail, the memory 520 may include an operating system 526 and one or more application programs or services for implementing the features disclosed herein, including a runtime API module 528 and a workflow engine module 530.

The runtime API module 528 may comprise code that causes the processor 522 to perform one or more operations related to a workflow. In some embodiments, the runtime API module 528 communicate with one or more calling clients from a user device (e.g., user device 504). For example, the runtime API module 528 may enable a calling client (e.g., the first user application 516, the second user application 518, etc.) to create a new workflow instance (e.g., a workflow update process) that executes on the workflow management system 506 on behalf of the calling client. In some embodiments, the runtime API module 528 may enable the calling client to execute one or more actions related to updating a workflow, including, but not limited to, loading a workflow graph and/or context, performing one or more workflow steps, calling into the workflow engine module 530 to perform a checkpoint phase, etc. In some embodiments, the runtime API module 528 may be similar to the runtime API 112 of FIG. 1, and/or may perform any of the operations of the runtime API described herein.

The workflow engine module 530 may comprise code that causes the processor 522 to perform one or more operations of a workflow engine, as described herein. In some embodiments, the workflow engine module 530 may implement a checkpoint phase that performs a consensus algorithm, as described herein. In implementing the checkpoint phase, the workflow engine module 530 may receive one or more checkpoint data (e.g., first checkpoint data and second checkpoint data) from parallel executing workflow instances performing respective workflow updates. The consensus algorithm may then compare one or more data elements of the first checkpoint data with one or more respective elements of the second checkpoint data. The consensus algorithm may then determine a particular use case based on this comparison (e.g., see Table 1). Then, the consensus algorithm may determine a result based on the use case. Upon determining the result, the checkpoint phase may be completed. The workflow engine module 530 may then transmit a result to respective hosts (and/or threads) associated with the workflow update.

Figure 6:
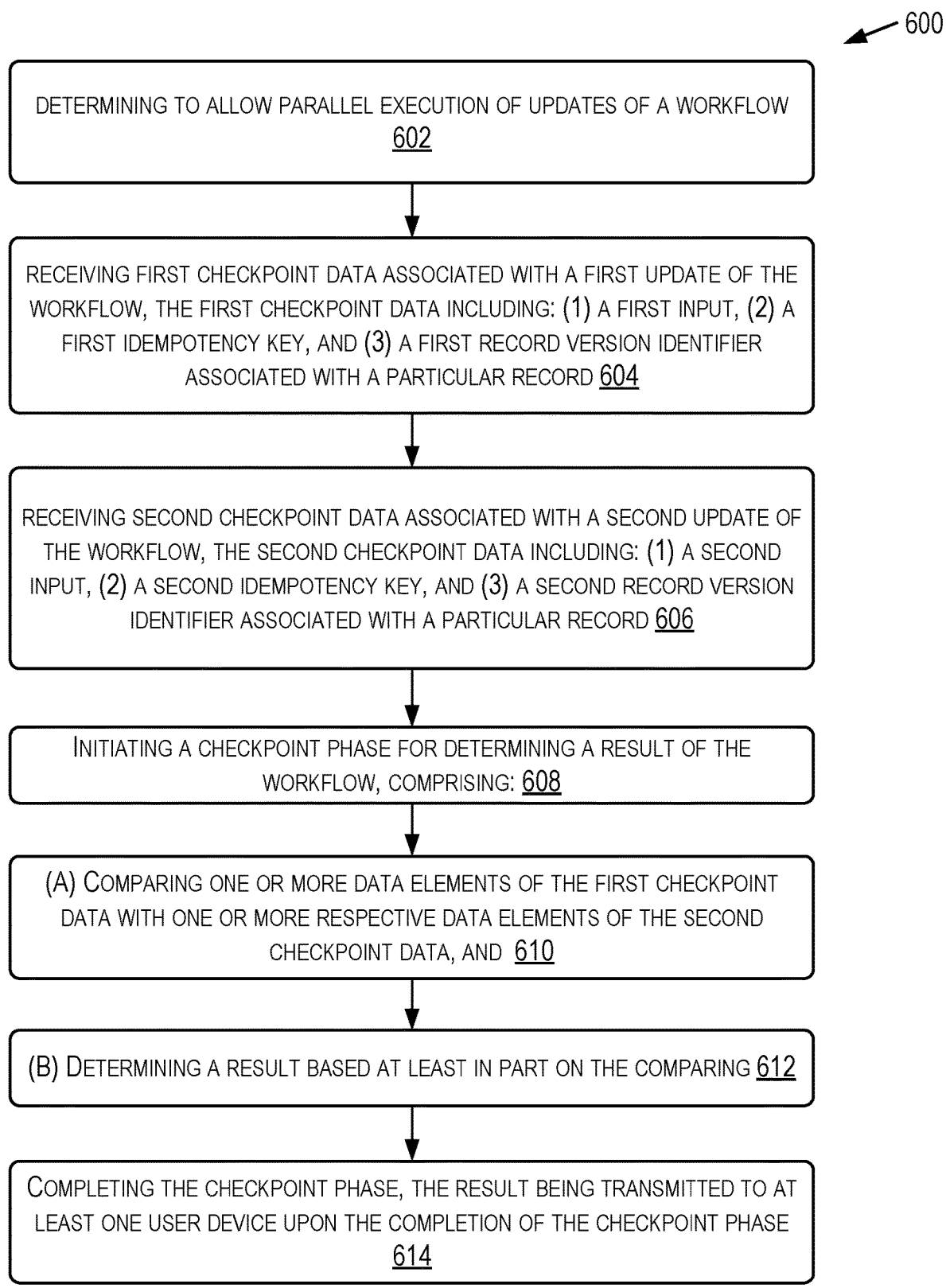
FIG. 6 is a simplified flow diagram illustrating an example process for a workflow management system performing a checkpoint phase to merge updates to a workflow, according to some embodiments.

FIG. 6 is a simplified flow diagram illustrating an example process for a workflow platform performing a checkpoint phase to merge updates to a workflow, according to some embodiments. Process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

In some embodiments, process 600 may be performed by a workflow management system (e.g., a workflow engine of the system), which may correspond to any one or more of the workflow management systems described herein. In some embodiments, the one or more of the operations of process 600 may be similar to any one or more of the operations of block 214 of FIG. 2. At block 602, the workflow management system may determine to allow parallel execution of updates of a workflow. In some embodiments, the updates may be executed by a plurality of threads, including a first thread and a second thread (e.g., both executing on a user device, such as user device 102 of FIG. 1). In some embodiments, the determination to allow parallel updates may include not providing a lock to the first thread that is requesting to perform an update (e.g., so that the second thread may be enabled to perform a parallel update). In some embodiments, two or more updates may be executed in parallel when at least one or more operations of the respective updates (e.g., loading a workflow graph, performing workflow steps, etc.) are performed within a predefined threshold amount of gap time between the one or more operations. In some embodiments, even though the two threads may execute updates in parallel, the first thread (or, in another embodiment, the second thread) may execute one or more operations of the first update first, and reach the checkpoint phase before the second update of the second thread. In some embodiments, a workflow update may include one or more workflow steps of the workflow. In some embodiments, as described herein, a thread may execute a workflow update by calling a runtime API of the workflow management system. In one example, the thread may create a workflow instance process that executes on a workflow platform of the workflow management system. The workflow instance may perform one or operations corresponding to the workflow update, including, for example, loading a workflow graph and/or an associated workflow context, performing the one or more workflow steps of the workflow update, calling the workflow engine to perform a checkpoint phase, etc. It should be understood that, although the process 600 may be primarily described with respect to two threads (e.g., executing on a user device), the process 600 may be performed by client processes (e.g., two or more browser application processes), two or more hosts, and/or any suitable combination thereof.

At block 604, the workflow management system may receive first checkpoint data associated with a first update of the workflow. In some embodiments, the first checkpoint data is associated with the first thread. In some embodiments, the first checkpoint data may include: (1) a first input, (2) a first idempotency key, and (3) a first record version identifier (e.g., a first RVN).

At block 606, the workflow management system may receive second checkpoint data associated with a second update of the workflow. In some embodiments, The second checkpoint data may be associated with the second thread. In some embodiments, the second update may be completed based at least in part on the determination to allow parallel execution of the workflow updates. In some embodiments, the second checkpoint data may include: (1) a second input, (2) a second idempotency key, and (3) a second record version identifier (e.g., a second RVN).

At block 608, the workflow management system may initiate a checkpoint phase for determining a result of a merge of the updates (e.g., the first update and second update) of the workflow, which may include performing one or more of the operations of block 610 and block 612, described below.

At block 610, the workflow management system may compare one or more data elements of the first checkpoint data with one or more respective data elements of the second checkpoint data. In some embodiments, the workflow management system may determine a particular use case of possible use cases based on the comparison. In some embodiments, the set of possible uses cases may correspond to the uses cases depicted in Table 1, and illustrated in FIGS. 2-4. For example, in a case where the first input is the same as (e.g., matches) the second input, and the first idempotency key is the same as (e.g., matches) the second idempotency key, the workflow management system may determine that this scenario corresponds to the first use case (e.g., a retry scenario of the same update of the workflow). In this case, even if the current RVN does not match the second RVN (e.g., because the current RVN has already been incremented based on the first RVN first initiating the checkpoint phase), the workflow management system may determine that both the first update and the second update correspond to the same update based only on comparing the inputs and the idempotency keys. In another case (e.g., the second and/or third use case), the system may determine a "winning" and "losing" thread based in part on comparing the RVN for a particular checkpoint data element (e.g., of each update) against the current RVN. In some embodiments, "winner" and/or "loser" in these second and/or third use cases may be determined based in part on which thread was the first to reach the checkpoint phase (i.e., prompting the current RVN to be incremented), which may, in turn, be based on which thread was the first to begin executing the update (e.g., as described with respect to block 602, above).

At block 612, the workflow management system may determine a result based at least in part on the comparing. For example, continuing with the first use case scenario above, the workflow management system may determine a "Success" result for both the first update and the second update (e.g., since they both are determined to correspond to the same update, via retry scenario). In another use case (e.g., the second or third use case), the workflow management system may return a "Success" result for one thread and a "Conflict Exception" for the other thread. It should be understood that either the first thread or the second thread may be the "winning" thread, for example, based on which parallel-executing workflow update successfully performed a write that caused the current RVN to be incremented.

At block 614, the workflow management system may complete the checkpoint phase. In some embodiments, the result may be transmitted to at least one of the threads upon the completion of the checkpoint phase. For example, in the first use case scenario, the "Success" result may be transmitted to the first thread and the second thread that are both associated with a same user application. The user application executing on the user device (e.g., user device 102) may have spawned the two threads and may receive one or more of the results, and whereby either (or both) result may be used for presentation to the GUI 110 of the user application (e.g., depicting a single success indicator, such as a checked box, green light, etc., indicating that one or more workflow steps of the workflow update has been recorded by the system). Note that, even if one of the threads (e.g., the thread that actually performed the write) may have lost network connection, the user application may still receive the "Success" result in a more efficient method than conventional methods, at least because the other thread may also receive the "Success" result.

Figure 7:
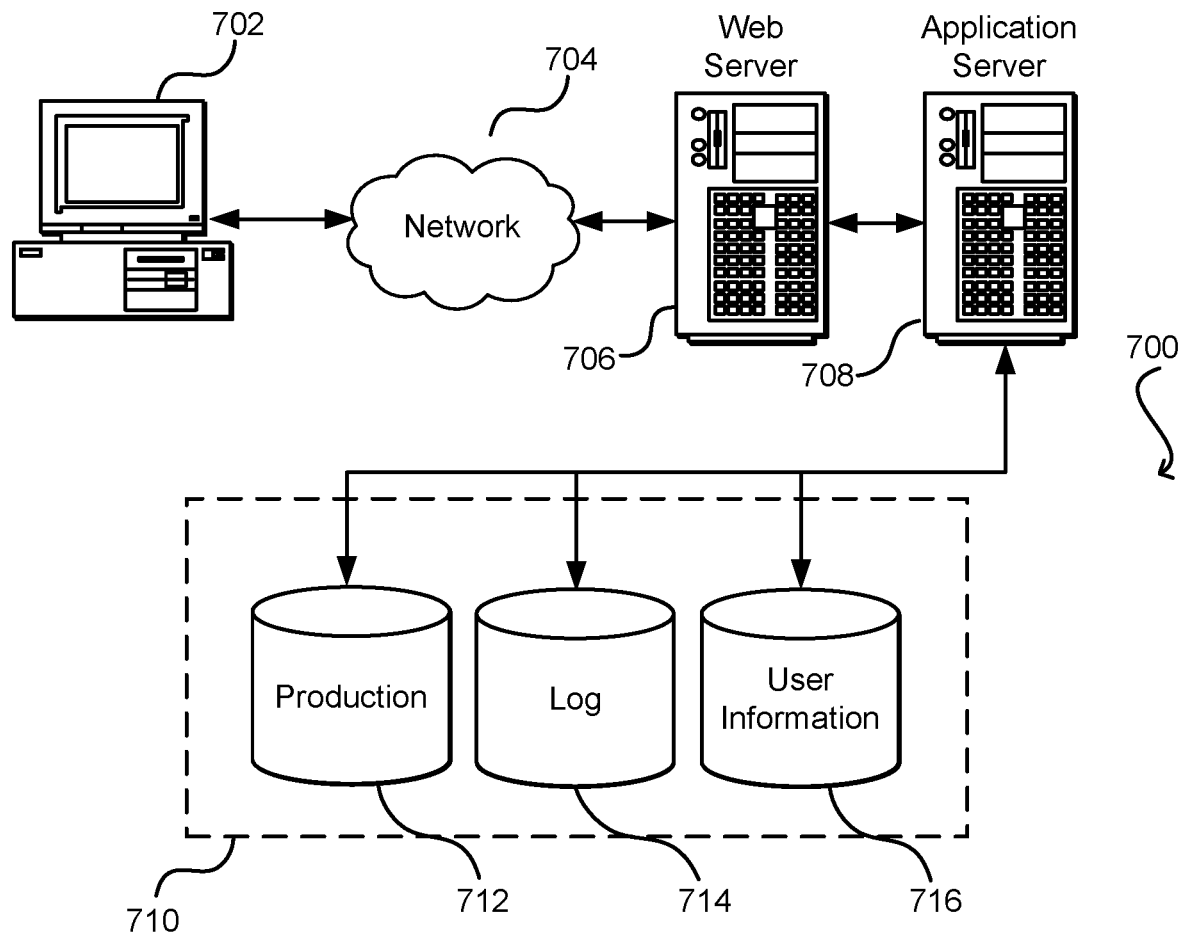
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environtext in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the environment 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   determining, by a workflow management system, to allow parallel execution of a workflow step of a workflow by a plurality of threads, including a first thread and a second thread;
   receiving, by the workflow management system, first checkpoint data associated with a first update of the first thread, the first update corresponding to a first completion of the workflow step, and the first checkpoint data including: (1) a first input, (2) a first idempotency key, and (3) a first record version identifier associated with a particular record;

initiating, by the workflow management system, a checkpoint phase for determining a result of the workflow, the checkpoint phase comprising:

retrieving, by the workflow management system, a current record version identifier associated with a current version the particular record;

updating, by the workflow management system, the current record version identifier based at least in part on the first record version identifier;

receiving, by the workflow management system, second checkpoint data associated with a second update of the second thread, the second checkpoint data corresponding to a second completion of a same workflow step, and the second checkpoint data including: (1) a second input, (2) a second idempotency key, and (3) a second record version identifier associated with the particular record, the second completion based at least in part on the determination to allow parallel execution of the same workflow step;

comparing, by the workflow management system, at least one or more of: (1) the first input with the second input, (2) the first idempotency key with the second idempotency key, or (3) the updated current record version identifier with the second record version identifier; and determining, by the workflow management system, the result based at least in part on the comparing, the result indicating whether the second update is successful; and completing, by the workflow management system, the checkpoint phase, the result being transmitted to at least the second thread upon the completion of the checkpoint phase.

2. The computer-implemented method of claim 1, wherein the first input is determined to match the second input and the first idempotency key is determined to match the second idempotency key, and wherein the result indicates that the second update is successful based at least in part on respectively matching data elements.

3. The computer-implemented method of claim 2, wherein determining the result further comprises determining that the first update is also successful based at least in part on the comparing, the method further comprising:

transmitting the result to the first thread upon completion of the checkpoint phase.

4. The computer-implemented method of claim 1, wherein the workflow corresponds to a synchronous workflow, the workflow step being one of a plurality of workflow steps of the workflow, an execution of a next workflow step being dependent on successful completion of the workflow step, and wherein transmitting the result to the second thread enables a prompting of the execution of the next workflow step.

5. A computing device, comprising:

a memory comprising computer-executable instructions; and one or more processors in communication with the memory and configured to access the memory and execute the computer-executable instructions to perform, at least:

determining to allow parallel execution of a plurality of updates of a workflow;

receiving first checkpoint data associated with a first update of the workflow, the first checkpoint data including: (1) a first input, (2) a first idempotency key, and (3) a first record version identifier associated with a particular record;

receiving second checkpoint data associated with a second update of the workflow, the second checkpoint data including: (1) a second input, (2) a second idempotency key, and (3) a second record version identifier associated with the particular record, the second update being completed based at least in part on the determination to allow parallel execution of the updates;

initiating a checkpoint phase for determining a result of the workflow, the checkpoint phase comprising:

comparing one or more data elements of the first checkpoint data with one or more respective data elements of the second checkpoint data; and determining the result based at least in part on the comparing; and completing the checkpoint phase, the result being transmitted to at least one user device for presentation of the result upon the completion of the checkpoint phase.

6. The computing device of claim 5, wherein the workflow includes one or more workflow steps, the first update associated with a completion of at least one workflow step of the workflow.

7. The computing device of claim 5, wherein comparing the one or more data elements further comprises determining that the first input matches the second input and the first idempotency key matches the second idempotency key, and wherein a respective result of the first update and the second update is determined to be successful based at least in part on the comparing.

8. The computing device of claim 5, wherein comparing the one or more data elements further comprises determining that the first idempotency key matches the second idempotency key and that the first input is different from the second input, and wherein determining the result further comprises comparing a current record version identifier of the particular record with at least one of the first record version identifier or the second record version identifier.

9. The computing device of claim 8, wherein the result indicates that the second update resulted in a conflict exception, and wherein the transmitting of the result prompts a client of the at least one user device to merge the first update and the second update.

10. The computing device of claim 5, wherein a workflow engine of the computing device receives the first checkpoint data prior to the second checkpoint data, and wherein the memory comprises further computer-executable instructions that, when executed by the one or more processors, further cause the computing device to perform, at least:

retrieving, by the workflow engine, a current record version identifier associated with a current version the particular record; and updating, by the workflow engine, the current record version identifier based at least in part on comparing the current record version identifier with the first record version identifier.

11. The computing device of claim 5, wherein comparing the one or more data elements further comprises determining that the first idempotency key is different from the second idempotency key, and wherein determining the result further comprises comparing a current record version identifier of the particular record with at least one of the first record version identifier or the second record version identifier.

12. The computing device of claim 11, wherein the first input and the second input have equal values or are different.

13. The computing device of claim 5, wherein the first update is associated with a first host and the second update is associated with a second host.

14. The computing device of claim 5, wherein the first update is associated with a first thread and the second update is associated with a second thread, both the first thread and the second thread executing on the at least one user device transparent to a user.

15. The computing device of claim 5, wherein the workflow is associated with a workflow graph and a workflow context that are maintained by a data store associated with the computing device, and wherein the workflow context is associated with a present state of at least one workflow step of the workflow graph.

16. One or more non-transitory computer-readable storage media comprising computer-executable instructions that, when executed by one or more processors, cause the one or more processors to perform, at least:
   determining to allow parallel execution of updates of a workflow by a plurality of threads including a first thread and a second thread;
   receiving first checkpoint data associated with a first update of the workflow, the first checkpoint data associated with the first thread and including: (1) a first input, (2) a first idempotency key, and (3) a first record version identifier associated with a particular record;
   receiving second checkpoint data associated with a second update of the workflow, the second checkpoint data associated with the second thread and including: (1) a second input, (2) a second idempotency key, and (3) a second record version identifier associated with the particular record, the second update being completed based at least in part on the determination to allow parallel execution of the updates;
   initiating a checkpoint phase for determining a result of the workflow, the checkpoint phase comprising:
      comparing one or more data elements associated with the first checkpoint data with one or more respective data elements of the second checkpoint data; and
      determining the result based at least in part on the comparing; and
      completing the checkpoint phase, the result being transmitted to at least one of the first thread or the second thread upon the completion of the checkpoint phase.

17. The one or more non-transitory computer-readable storage media of claim 16, wherein the first thread and the second thread are both executed on a user device, the first thread and second thread being associated with a same user application, the user application presenting a graphical user interface (GUI).

18. The one or more non-transitory computer-readable storage media of claim 17, wherein the workflow is associated with a customer order, the first update is associated with a customer order fulfillment of the customer order, and wherein the second update corresponds to a retry of the first update upon the first thread having a broken network connection.

19. The one or more non-transitory computer-readable storage media of claim 18, wherein the result includes a first result and a second result, the first result and the second result respectively indicating that the first update and the second update are successful, the first result being transmitted the first thread and the second result being transmitted to the second thread, and wherein at least one of the first result or the second result is utilizable for presenting a single success indicator on the graphical user interface of the user device.

20. The one or more non-transitory computer-readable storage media of claim 16, wherein the workflow includes a synchronous workflow, the synchronous workflow including a plurality of synchronized workflow steps, and wherein the first update and the second update respectively correspond to an execution of at least one of the synchronized workflow steps.

* * * * *